US008953537B2

(12) United States Patent
Hariharan et al.

(10) Patent No.: US 8,953,537 B2
(45) Date of Patent: Feb. 10, 2015

(54) TRANSMIT POWER CONTROL SIGNALING FOR COMMUNICATION SYSTEMS USING CARRIER AGGREGATION

(75) Inventors: Priya Hariharan, Dallas, TX (US); Akihiko Nishiko, Kanagawa (JP); Christian Wengerter, Kleinheubach (DE)

(73) Assignee: Panasonic Intellectual Property Corporation of America, Torrance, CA (US)

(*) Notice: Subject to any disclaimer, the term of this patent is extended or adjusted under 35 U.S.C. 154(b) by 16 days.

(21) Appl. No.: 13/521,159

(22) PCT Filed: Nov. 30, 2010

(86) PCT No.: PCT/EP2010/007260
§ 371 (c)(1),
(2), (4) Date: Sep. 27, 2012

(87) PCT Pub. No.: WO2011/082744
PCT Pub. Date: Jul. 14, 2011

(65) Prior Publication Data
US 2013/0182654 A1    Jul. 18, 2013

(30) Foreign Application Priority Data
Jan. 11, 2010   (EP) .................................... 10000191

(51) Int. Cl.
*H04W 52/54*   (2009.01)
*H04W 52/58*   (2009.01)
*H04W 52/34*   (2009.01)

(52) U.S. Cl.
CPC .............. *H04W 52/54* (2013.01); *H04W 52/58* (2013.01); *H04W 52/34* (2013.01)
USPC ........................................................ 370/329

(58) Field of Classification Search
USPC .................................. 370/329, 328, 310, 311
See application file for complete search history.

(56) References Cited

U.S. PATENT DOCUMENTS

| 2003/0026219 A1 | 2/2003 | Moon et al. |
| 2004/0066772 A1 | 4/2004 | Moon et al. |

(Continued)

FOREIGN PATENT DOCUMENTS

| JP | 2002-508620 A | 3/2002 |
| JP | 2005-045504 A | 2/2005 |

(Continued)

OTHER PUBLICATIONS

European Search Report for Application No. 10000191.6-2411 dated Jul. 26, 2010.

(Continued)

*Primary Examiner* — Andrew Lai
*Assistant Examiner* — Zhiren Qin
(74) *Attorney, Agent, or Firm* — Pearne & Gordon LLP

(57) ABSTRACT

Transmission power control and signaling from a base station to a group of terminals in a system such as LTE supporting carrier aggregation. The transmission power control message has a plurality of transmission control fields of which a multiple is assigned to each terminal. A transmission control field carries a transmission power command for the respective uplink component carrier and the respective mobile terminal. The transmission power control message is mapped to a control signaling region of a downlink component carrier and transmitted within a subframe.

18 Claims, 12 Drawing Sheets

(56) References Cited

U.S. PATENT DOCUMENTS

| | | |
|---|---|---|
| 2005/0053036 A1 | 3/2005 | Takeda |
| 2008/0108379 A1 | 5/2008 | Cho et al. |
| 2008/0220804 A1 | 9/2008 | Cho et al. |
| 2008/0227476 A1 | 9/2008 | Cho et al. |
| 2008/0316950 A1 | 12/2008 | Damnjanovic |
| 2009/0239590 A1 | 9/2009 | Parkvall |
| 2010/0238892 A1 | 9/2010 | Dahlman et al. |
| 2010/0260117 A1 | 10/2010 | Ojala et al. |
| 2010/0303011 A1* | 12/2010 | Pan et al. ............ 370/328 |
| 2011/0038271 A1* | 2/2011 | Shin et al. ............ 370/252 |
| 2014/0080538 A1 | 3/2014 | Damnjanovic |
| 2014/0128120 A1 | 5/2014 | Dahlman et al. |

FOREIGN PATENT DOCUMENTS

| | | |
|---|---|---|
| JP | 2009-540730 A | 11/2009 |
| JP | 2010-531579 A | 9/2010 |
| JP | 2011-501502 A | 1/2011 |
| WO | 99/49595 A1 | 9/1999 |
| WO | 2008/096326 A2 | 8/2008 |
| WO | 2009/040636 A1 | 4/2009 |
| WO | 2009/048404 A1 | 4/2009 |
| WO | 2009/113934 A1 | 9/2009 |

OTHER PUBLICATIONS

3GPP TS 36.212 V8.8.0 (Dec. 2009), Evolved Universal Terrestrial Radio Access (E-UTRA); Multiplexing and channel coding.

CMCC, Method to decrease blind decoding attempts in common search space, 3GPP TSG RAN WG1 meeting #58bis R1-094036, Miyazaki, Japan, Oct. 12, 2009.

Texas Instruments, PDCCH Carrier Indication Field for Cross-Carrier Scheduling, 3GPP TSG RAN WG1 #59 R1-094761, Jeju, Korea, Nov. 13, 2009.

* cited by examiner

TRANSMIT POWER CONTROL SIGNALING FOR COMMUNICATION SYSTEMS USING CARRIER AGGREGATION

FIELD OF THE INVENTION

This invention relates to methods for transmitting and receiving transmit power control commands from a base station to a group of mobile terminals in a OFDM based mobile communication system using component carrier aggregation of plural component carriers. Furthermore, the invention also relates to an implementation of these methods in hardware and software.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UT-RAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols are thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example discussed in the "Long Term Evolution" work item of 3GPP, the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see 3GPP TS 36.211, "Evolved Universal Terrestrial Radio Access (E-UTRA); Physical Channels and Modulation (Release 8)", version 8.7.0, section 6.2, available at http://www.3gpp.org and incorporated herein by reference).

General Structure for Downlink Physical Channels

The general downlink LTE baseband signal processing according to 3GPP TS 36.211, "Evolved Universal Terrestrial Radio Access (E-UTRA); Physical channels and modulation", version 8.6.0, March 2009, section 6.3 (available at http://www.3gpp.org and incorporated herein by reference) is exemplarily shown in FIG. 6. Further details on the LTE downlink can be found in 3GPP TS 36.211, section 6. A block of coded bits is first scrambled. Up to two code words can be transmitted in one sub-frame.

In general, scrambling of coded bits helps to ensure that receiver-side decoding can fully utilize the processing gain provided by channel code. For each codeword, by applying different scrambling sequence for neighboring cells, the interfering signals are randomized, ensuring full utilization of the processing gain provided by the channel code. The scrambled bits are transformed to a block of complex modulation symbols using the data modulator for each codeword. The set of modulation schemes supported by LTE downlink includes QPSK, 16-QAM and 64-QAM corresponding to 2, 4 or 6 bits per modulation symbol.

Layer mapping and precoding are related to MIMO applications. The complex-valued modulation symbols for each of the code words to be transmitted are mapped onto one or several layers. LTE supports up to four transmit antennas. The antenna mapping can be configured in different ways to provide multi antenna schemes including transmit diversity, beam forming, and spatial multiplexing. Further the resource block mapper maps the symbols to be transmitted on each antenna to the resource elements on the set of resource blocks assigned by the scheduler for transmission. The selection of resource blocks depends on the channel quality information.

Downlink control signaling is carried out by three physical channels:
  PCFICH to indicate the number of OFDM symbols used for control signaling in a sub-frame (i.e. the size of the control channel region)
  PHICH which carries downlink ACK/NACK associated with UL data transmission
  PDCCH which carries downlink scheduling assignments and uplink scheduling assignments.

Downlink Reception in 3GPP LIE

In 3GPP LTE (Release 8), where there is only once component carrier in uplink and downlink, the PORCH is sent at a known position within the control signaling region of a downlink sub-frame using a known modulation and coding scheme. As the determination of the downlink resources assigned to the user equipment depends on the size of the control signaling region of the sub-frame, i.e. the number of OFDM symbols used for control signaling in the given sub-frame, the user equipments needs to decode the PCFICH in order to obtain the signaled PORCH value, i.e. the actual number of OFDM symbols used for control signaling in the sub-frame.

If the user equipment is unable to decode the PCFICH or obtains an erroneous PCFICH value, this PCFICH detection error will result in the user equipment not being able to correctly decode the L1/L2 control signaling (PDCCHs) comprised in the control signaling region, so that all resource assignments contained therein are lost.

Physical Downlink Control Channel (PDCCH) Assignment

The physical downlink control channel (PDCCH) carries scheduling grants for allocating resources for downlink or uplink data transmission. Each scheduling grant is defined based on Control Channel Elements (CCEs). Each CCE corresponds to a set of Resource Elements (RES). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, PDCCH can aggregate 1, 2, 4 or 8 CCEs available for control channel assignment is a function of several factors, including carrier bandwidth, number of transmit antennas, number of OFDM symbols used for control and the CCE size, etc. Multiple PDCCHs can be transmitted in a sub-frame.

On a transport channel level, the information transmitted via the PDCCH is also refereed L1/L2 control signaling. L1/L2 control signaling is transmitted in the downlink for each user equipment (UE). The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length (in the time domain) is equivalent to either one or multiple sub-frames. The TTI length may be fixed in a service area for all users, may be different for different users, or may even by dynamic for each user. Generally, then the L1/L2 control signaling needs only be transmitted once per TTI.

Furthermore, the PDCCH information sent on the L1/L2 control signaling may be separated into the Shared Control Information (SCI) and Dedicated Control Information (DCI)—please note that sometimes the acronym DCI is also referred to as Downlink Control Information.

DCI transports downlink or uplink scheduling information, or uplink power control commands for one RNTI (Radio Network Terminal Identifier). The RNTI is a unique identifier commonly used in LTE for destining data or information to a specific user equipment. The RNTI is implicitly included in the DCI by masking the CRC of the encoded payload data of the DCI with the RNTI. On the user equipment side, if decoding of the payload size of data is successful, the user equipment detects the DCI to be destined to the user equipment by checking whether the CRC on the decoded payload data using the "unmasked" CRC (i.e. after removing the masking using the RNTI) is successful. Please note that the masking of the CRC code is performed by scrambling the CRC with the RNTI.

In 3GPP LTE (Release 8) the following different DCI formats are defined:
  Uplink DCI Formats
    Format 0 used for transmission of UL SCH assignments
    Format 3 is used for transmission of TPC commands for PUCCH and PUSCH with 2 bit power adjustments (multiple UEs are addressed)

Format 3A is used for transmission of TPC commands for PUCCH and PUSCH with single bit power adjustments (multiple UEs are addressed)

Downlink DCI Formats

Format 1 used for transmission of DL SCH assignments for SIMO operation

Format 1A used for compact transmission of DL SCH assignments for SIMO operation Format 1B used to support closed loop single rank transmission with possibly contiguous resource allocation Format 1C is for downlink transmission of paging, RACH response and dynamic BCCH scheduling Format 1D is used for compact scheduling of one PDSCH codeword with precoding and power offset information Format 2 is used for transmission of DL-SCH assignments for closed-loop MIMO operation Format 2A is used for transmission of DL-SCH assignments for open-loop MIMO operation For further information on the LTE physical channel structure in downlink and the PDSCH and PDCCH format, see Stefania Sesia et al., "LTE—The UMTS Long Term Evolution", Wiley & Sons Ltd., ISBN 978-0-47069716-0, April 2009, sections 6 and 9.

Blind Decoding of PDCCHs at the User Equipment

In 3GPP LTE (Release 8), the user equipment attempts to detect the DCI within the PDCCH using so-called "blind decoding". This means that there is no associated control signalling that would indicate the CCE aggregation size or modulation and coding scheme for the PDCCHs signaled in the downlink, but the user equipment tests for all possible combinations of CCE aggregation sizes and modulation and coding schemes, and confirms that successful decoding of a PDCCH based on the RNTI as described above. To further limit complexity a common and dedicated search space in the control signaling region of the LTE component carrier is defined in which the user equipment searches for PDCCHs.

In 3GPP LTE (Release 8) the PDCCH payload size is detected in one blind decoding attempt. The user equipment attempts to decode two different payload sizes for any configured transmission mode, as highlighted in Table 1 below. Table 1 shows that payload size X of DCI formats 0, 1A, 3, and 3A is identical irrespective of the transmission mode configuration. The payload size of the other DCI format depends on the transmission mode.

TABLE 1

DCI formats

| payload size X | payload size different from X | transmission mode | |
|---|---|---|---|
| 0/1A/3/3A | 1C | | broadcast/unicast/paging/power control |
| | 1 | Mode 1 | DL TX modes |
| | 1 | Mode 2 | |
| | 2A | Mode 3 | |
| | 2 | Mode 4 | |
| | 1B | Mode 5 | |
| | 1D | Mode 6 | |
| | 1 | Mode 7 | |
| | 1 | Mode 1 | SPS-Modes |
| | 1 | Mode 2 | |
| | 2A | Mode 3 | |
| | 2 | Mode 4 | |
| | 1 | Mode 7 | |

Accordingly, the user equipment can check in a first blind decoding attempt the payload size of the DCI. Furthermore, the user equipment is further configured to only search for a given subset of the DCI formats in order to avoid too high processing demands.

Uplink Power Control in 3GPP LTE

Uplink power control controls the transmit power of the different uplink physical channels. The setting of the user equipment's transmit power $P_{PUSCH}$ (measured in dB) for the physical uplink shared channel (PUSCH) transmission in subframe i is defined by the equation:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\}$$

Similarly, for physical uplink control channel (PUCCH) transmission the transmit power control is given by, $$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$

where $\delta_{PUSCH}$ ($/\delta_{PUCCH}$) is a UE specific correction value, also referred to as a Transmit Power Control (TPC) command and is included in PDCCH with DCI format 0 (/downlink DCI formats) or jointly coded with other TPC commands in PDCCH with DCI format 3/3A whose CRC parity bits are scrambled with TPC-PUSCH (/PUCCH)-RNTI. The current PUSCH (/PUCCH)-power control adjustment state is given by f(i) which is defined by:

$$f(i) = f(i-1) + \delta_{PUSCH}(i - K_{PUSCH}) \text{ for PUSCH},$$

$$g(i) = g(i-1) + \sum_{m=0}^{M-1} \delta_{PUCCH}(i - k_m), \text{ for PUCCH}$$

if accumulation is enabled based on the UE-specific parameter Accumulation-enabled provided by higher layers.

DCI Format 3/3A in 3GPP LTE

DCI Format 3

DCI format 3 is used for the transmission of TPC commands for PUCCH and PUSCH and includes transmit power control fields (TPC fields) that have a size of two bits, i.e. allow for 2-bit power adjustments. The DCI format 3 consists of a given number of N TPC fields, wherein each TPC field includes a TPC command for a different UE. A UE is only assigned one TPC field in a PDCCH of DCI format 3. If multiple PDCCHs of DCI format 3 are transmitted in the sub-frame, still there is only one TPC field in one PDCCH assigned to the UE. The number of TPC fields in the DCI format 3 is given by $$N = \left\lfloor \frac{L_{format\ 0}}{2} \right\rfloor$$

and where, $L_{format\ 0}$ is equal to the payload size of format 0 (scheduling of an uplink assignment) before CRC attachment, including any padding bits appended to format 0. The parameter tpc-index provided by higher layers determines the index to the TPC field/command for a given user equipment. If $$\left\lfloor \frac{L_{format\ 0}}{2} \right\rfloor < \frac{L_{format\ 0}}{2},$$

a bit of value zero is be appended to format 3. Multiple PDCCH with DCI of format 3 transmitted within a sub-frame are addressed to groups of UEs by masking the CRC with respective RNTIs, so-called TPC-RNTIs that are specifically defined in the system for power control signaling. Each user equipment is assigned one of the TPC-RNTIs which is used in the blind detection of the PDCCH carrying the DCI of format 3.

The Table 2 below shows the mapping of TPC command values in DCI format 3 for PUSCH as specified in 3GPP LTE (Release 8)—see 3GPP TS 36.212 "Evolved Universal Terrestrial Radio Access (E-UTRA); Multiplexing and channel coding", version 8.8.0, and 3GPP TS 36.213, "Evolved Universal Terrestrial Radio Access (E-UTRA); Physical layer procedures", version 8.8.0, available at http://www.3gpp.org.

TABLE 2

| TPC Command Field in DCI format 0/3 | Accumulated $\delta_{PUSCH}$ [dB] | Absolute $\delta_{PUSCH}$ [dB] (only for DCI format 0) |
| --- | --- | --- |
| 0 | −1 | −4 |
| 1 | 0 | −1 |
| 2 | 1 | 1 |
| 3 | 3 | 4 |

Similarly TPC values are also defined for PUCCH.

Format 3A

DCI format 3A is used for the transmission of TPC commands for PUCCH and PUSCH with single bit power adjustments. With respect to its structure SCI format 3A includes twice as many TPC fields as DCI format 3, but the TPC field size is ½ of the TPC field size for DCI format 3, i.e. only one bit. DCI format 3A thus consists of a given number of $M=L_{format\ 0}$ TPC fields, wherein each TPC field includes a TPC command for a different UE, where $L_{format\ 0}$ is again equal to the payload size of format 0 before CRC attachment, including any padding bits appended to format 0. Further, also for DCI format 3A higher layer signaling provides the UE with the parameter tpc-index provided by higher layers determines the index to the TPC field/command for a given user equipment and the TPC-RNTI to use for blind detection.

Table 3 below shows the mapping of TPC command values in DCI format 3A for both PUCCH and PUSCH as specified in 3GPP LTE (Release 8).

TABLE 3

| TPC Command Field in DCI format 3A | $\delta_{PUSCH}$ [dB] |
| --- | --- |
| 0 | −1 |
| 1 | 1 |

Further Advancements for LTE—LTE-Advanced (3GPP LTE-A)

The frequency spectrum for IMT-Advanced was decided at the World Radio communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, e.g. to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers as defined for LTE (Release 8)—see FIG. 3 and FIG. 4 discussed above are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:

An LTE-Advanced (Release 10) compatible mobile terminal with reception and/or transmission capabilities for carrier aggregation can simultaneously receive and/or transmit on multiple component carriers. There is one Transport Block (in absence of spatial multiplexing) and one HARQ entity per component carrier.

An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A (Release 10) component carriers is not precluded. Accordingly, it will be possible to configure a user equipment to aggregate a different number of component carriers of possibly different bandwidths in the uplink and the downlink.

PDCCH Structure and Cross-Carrier Scheduling 3GPP LTE-A

As indicated above, in 3GPP LTE-A (Release 10) carrier aggregation, i.e. the use of multiple component carriers in uplink and downlink, respectively will be used. It is presently envisioned by the 3GPP to utilize cross-carrier scheduling, which means that a (single) PDCCH on one of the downlink component carriers can assign downlink (Physical Downlink Shared Channel—PDSCH) or uplink resources (on the Physical Uplink Shared Channel—PUSCH) on multiple component carriers (see 3GPP Tdoc. R1-094959, "TP for TR36.814 on downlink control signaling for carrier aggregation", agreed in the 3GPP RAN 1 meeting no. 58, available at http://www.3gpp.org and incorporated herein by reference), Motivations for the use of cross-carrier scheduling are heterogeneous network operation, support extension carrier operation, efficient scheduling in case of PDCCH CCE blocking probability, etc.

It has been agreed in the 3GPP that the PDCCH on a (downlink) component carrier can assign PDSCH resources on the same component carrier and PUSCH resources on a single linked UL component carrier. Rel-8 PDCCH structure (same coding, same CCE-based resource mapping) and DCI formats are used on each component carrier. Furthermore, the PDCCH on a component carrier can be used to assign PDSCH or PUSCH resources in one of multiple component carriers using the carrier indicator field (CIF), where 3GPP LTE (Release 8) DCI formats are extended with a fixed 3 bits carrier indicator field, and 3GPP LTE (Release 8) PDCCH structure (same coding, same CCE-based resource mapping) is reused. The presence of carrier indicator field may be semi-statically configured.

With respect to transmit power control, the mechanisms proposed for 3GPP LTE (Release 8) may need some adaption and optimization for use in 3GPP LTE-A (Release 10). In contrast to 3GPP LTE (Release 8), carrier aggregation of multiple component carriers in uplink and downlink will be used in 3GPP LTE-A (Release 10), which requires enhanced signaling mechanisms for power control. As will be apparent from the following, a simple reuse of 3GPP LTE (Release 8) transmit power control. i.e. performing it simply for each uplink component carrier, is not efficient in terms of asymmetric uplink/downlink component carrier aggregation, its enhanced demands on blind decoding attempts by the user equipments and the related use of processing resources and (battery) power, control signaling overhead, etc.

SUMMARY OF THE INVENTION

One object of the invention is to suggest an efficient scheme for signaling transmit power control commands in a OFDM based mobile communication system using carrier aggregation in the uplink. More specifically, it would be beneficial to find a transmit power control signaling scheme that is at least more efficient with respect to one of the above mentioned potential drawbacks of a extending the 3GPP LTE (Release 8) transmit power control to a mobile communication system using carrier aggregation in the uplink.

The object is solved by the subject matter of the independent claims. Advantageous embodiments of the invention are subject to the dependent claims.

According to a first aspect of the invention (multiple) transmit power control commands for the uplink component carriers configured for a mobile terminal (referred to as user equipment in the 3GPP terminology) are provided to the mobile terminal within one transmit power control message. When implementing this aspect in a 3GPP based system, the power control message may be for example a PDCCH carrying DCI of a format based on the DCI format 3/3A for 3GPP LTE (Release 8); however, each DCI may comprise multiple TPC commands for a given mobile terminal. Furthermore, the transmit power control message is signaled within the control signaling region (i.e. a given number of OFDM symbols within the sub-frame dedicated to carry control information) of a downlink component carrier. A group of mobile terminals served by a base station are assigned respective multiple transmit power control fields in the transmit power control message.

In line with this first aspect, one embodiment of the invention is providing a method for transmitting transmit power control commands from a base station to a group of mobile terminals in a OFDM based mobile communication system using component carrier aggregation of plural component carriers. The base station generates a transmit power control message having a plurality of transmit power control field. Multiple of these transmit power control fields of the transmit power control message are respectively assigned to different mobile terminals, and the multiple transmit power control fields assigned to each mobile terminal are used for signaling transmit power commands for the respective uplink component carriers aggregated by the respective mobile terminal. The base station maps the transmit power control message to a control signaling region of a downlink component carrier, and further transmits within a sub-frame the transmit power control message comprised in the control signaling region of the downlink component carrier to the mobile terminals.

This way, the transmit power control of the different uplink component carriers of the respective mobile terminals of the given group of mobile terminals is possible. This means that the number of transmit power control fields assigned to one mobile terminal should be equal to or smaller than the number of uplink component carriers configured for the mobile terminal.

As mentioned above, different mobile terminals of the group of mobile terminals are assigned respective multiple transmit power control fields within the message. According to a further embodiment of the invention, the base station is transmitting an assignment message to a mobile terminal of the group of mobile terminals. Please note that respective assignment messages may be transmitted to the respective mobile terminals in this group. Each assignment message includes assignment information assigning the respective mobile terminal to the respective multiple of the plural transmit power control fields of the transit power control message and/or assigning one of the plural temporary identifiers to the mobile terminal. For example, the assignment message is a higher layer signaling message, e.g. a message of the radio resource control (RRC) layer/protocol. Please further note that the assignment messages may be used for configuration as well as re-configuration of the assignment of transmit power control fields.

To facilitate the assignment of transmit power control fields to the respective mobile terminals, the respective fields could be for example identified by indices. In a further embodiment of the invention, the assignment message indicates the indices of the transmit power control fields within the transmit power control message assigned to the (respective) mobile terminal.

As indicated above, the number of transmit power control fields assigned to a given mobile terminal may be smaller than the number of uplink component carriers configured for the mobile terminal. Another embodiment of the invention the uplink component carriers aggregated by the mobile terminals (of the given group of mobile terminals to which the transmit power control message pertains) are grouped into groups (subsets) of carriers. As will be outlined below, this grouping of carriers is another (third) aspect of the invention, which is independent from the signaling format for providing the power control commands to the mobile terminal(s). In this embodiment, the base station determines for each group of carriers of a respective mobile terminal, a carrier group transmit power control command for a respective mobile terminal. Each carrier group transmit power control command is a transmit power command to be applied by the respective mobile terminal to uplink transmissions on the uplink component carriers belonging to the respective group of carriers. The base station includes the carrier group transmit power control for the respective mobile terminal to one of the multiple transmit power control fields assigned to the mobile terminal within the transmit power control message.

The use of such carrier group transmit power control commands for group of carriers of a mobile terminal may be for example advantageous in terms of reducing the control signaling overhead by power controlling uplink component carriers of a mobile terminal that should experience similar power control (for example due to experiencing the same level of interference) by a single transmit power control command. The grouping of the component carriers configured for a given terminal could for example depend on at least on one of the following parameters:

interference conditions and power level on the assigned uplink component carrier, the channel quality on the assigned uplink component carrier, the bandwidth of the assigned uplink component carrier, status of a load balancing function for the uplink component carriers, the number of the transmit power control fields for a mobile terminal available at the base station the number of TPC RNTIs available at the base station, the type of the assigned uplink component carrier e.g. uplink anchor carrier, and the number of ACK/NACKs corresponding to the downlink data transmission that is to be signaled on the assigned uplink component carrier by the mobile terminal.

Furthermore, in another embodiment, it is envisioned that one transmit power control command is used to jointly control transmit power of all component carriers configured for the user equipment in the uplink. The remaining transmit power control fields in the transmit power control message may be for example used to fine-tune transmit power of selected uplink component carriers (or groups thereof) of the mobile terminal. In one exemplary implementation of this embodiment, one of the carrier group transmit power control commands could be an all carrier transmit power control command to control the transmit power used by said one mobile terminal for transmissions on all uplink component carriers configured for the mobile terminal.

In more detail, one of the multiple transmit power control fields within the transmit power control message assigned to one mobile terminal could be for example signaling a transmit power control command for all uplink component carriers configured for the mobile terminal, and the other transmit power control field(s) of the transmit power control message is/are signaling a transmit power control command for a subset of the uplink component carriers configured for the mobile terminal. The all carrier transmit power control command may be for example included by the base station within the first transmit power control field assigned to the respective one mobile terminal within the transmit power control message. This may be for example advantages as the use of the power control fields within the transmit power control message for respective types of transmit power control commands may not need to be signaled to the mobile terminal, but would be known to mobile terminal and base station.

In a further embodiment of the invention, the base station is generating a CRC code for the transmit power control fields of the transmit power control message. This CRC code is subsequently masked by the base station with one of plural temporary identifiers common to group of mobile terminals defined for transmit power control to obtain a masked CRC code. The masked CRC code is then included by the base station to a CRC field of the transmit power control message prior to mapping same to the control signaling region of the downlink component carrier for transmission.

Depending on the total number of mobile terminals to be served and power controlled, this could imply that a base station (referred to as an eNodeB in the 3GPP terminology) may need to signal multiple transmit power control messages for respective groups of mobile terminals in the downlink. Accordingly, in a further embodiment of the invention still in line with the first aspect of this invention, the base station generates and transmits within a given sub-frame plural transmit power control messages for different groups of mobile terminals within the control signaling region of a downlink component carrier. Each of the transmit power control messages is including a masked CRC masked with a different one of the plural temporary identifiers common to group of mobile terminals defined for transmit power control.

In a more detailed implementation of this embodiment, the base station for example further configures different common and/or dedicated search spaces of the mobile terminals by higher layer signaling such as RRC signaling. A search space of a mobile terminal defines a part of the control signaling region within the sub-frame in which the mobile terminal is to perform blind detection of the control information (including the transmit power control messages). The base station maps each transmit power control message to a part of the control signaling region of the downlink component carrier comprised in the search spaces of the mobile terminals assigned transmit power control fields within the respective transmit power control message.

While the different implementation examples according to different embodiments above referred to the operation of the base station, other embodiments of the invention also in line with the first aspect of the invention relate to the operation of a mobile terminal. Accordingly, one further embodiment of the invention provides a method for transmit power control of uplink component carriers of a mobile terminal within a OFDM based mobile communication system. In this method, the mobile terminal receives a sub-frame from a base station and performs, within the received sub-frame, a blind detection of a transmit power control message within a control signaling region of a downlink component carrier. The transmit power control message has a plurality of transmit power control fields. Multiple transmit power control fields of the plurality of transmit power control fields within the transmit power control message are assigned to the mobile terminal and include transmit power commands for the uplink component carriers aggregated by the mobile terminal. The mobile terminal determines the transmit power control commands for the mobile terminal's uplink component carriers from multiple transmit power control fields within the transmit power control message, and applies the transmit power control commands to uplink transmissions on the uplink component carriers aggregated for the mobile terminal.

In a further embodiment of the invention, the mobile terminal receives a higher layer signaling message, e.g. a RRC message, from the base station which is assigning the multiple transmit power control fields within the transmit power control message and/or one of plural temporary identifiers common to plural mobile terminals including the mobile terminal and defined for transmit power control to the mobile termini.

In another embodiment of the invention, the mobile terminal is obtaining a masked CRC code from a CRC field of the transmit power control message, and is de-masking the masked CRC code with one of plural temporary identifiers common to plural mobile terminals including the mobile terminal and defined for transmit power control to thereby obtain a CRC code. Furthermore, the mobile terminal verifies successful blind detection of the transmit power control message based on the CRC code.

In further embodiment, the mobile terminal receives from the base station a higher layer signaling message, such as a RRC message, which is indicating a common and/or dedicated search space defining a part of a control signaling region within the sub-frame in which the mobile terminal is to perform blind decoding of control information including the transmit power control message.

A second aspect of the invention is related to another signaling format of the transmit power control commands for a mobile terminal's uplink component carriers. According to this second aspect, the transmit power commands to be transmitted to a given mobile terminal are included into different transmit power control messages respectively, so that one transmit power control command is transmitted in a respective one transmit power control message. Accordingly, a respective transmit power control field in each transmit power control message is assigned to a respective single mobile terminal. Furthermore, the transmit power control fields for a mobile terminal may be located at a given location(s) (index/indices) within each of the transmit power control messages.

This allows to simplify the signaling overhead for assigning the transmit power control fields to the respective mobile terminals. Similar to the first aspect of the invention, the plural transmit power control messages may be transmitted on a single downlink component carrier to the mobile terminals.

In line with this second aspect of the invention, another embodiment provides a method for transmitting transmit power control commands from a base station to mobile terminals in a OFDM based mobile communication system using component carrier aggregation of plural component carriers, in which the base station is generating plural transmit power control messages for the mobile terminals. Each transmit power control message comprises a plurality of transmit power control fields and a respective one of the transmit power control fields of each transmit power control message is assigned to a respective one of the mobile terminals for signaling a transmit power command for at least one of the respective uplink component carriers configured for the respective one mobile terminal. Furthermore, the base station maps the transmit power control messages to a control signaling region of a downlink component carrier, and transmits within a sub-frame the transmit power control messages comprised within the control signaling region of the downlink component carrier to the mobile terminals.

In a more detailed implementation of the method according to a further embodiment of the invention, the base station generates a CRC sequence for each transmit power control message, and masks the CRC sequences for the transmit power control messages with different temporary identifiers defined for transmit power control. The base station then adds each masked CRC sequence to its corresponding transmit power control message prior to the mapping of the transmit power control messages to the control signaling region of the downlink component carrier.

Also in the embodiments according to the second aspect of the invention, a grouping of component carriers of a mobile terminal may be used. Therefore, in another embodiment of the invention, the uplink component carriers aggregated by the mobile terminals are grouped into groups of carriers and the base station determines for each group of carriers of a respective one of the mobile terminals, a carrier group transmit power control command for said one mobile terminal. As explained before, each carrier group transmit power control command is a transmit power command to be applied by said one mobile terminal to uplink transmissions on the uplink component carriers belonging to the respective group of carriers. The base station includes the carrier group transmit power control commands for the mobile terminal to the multiple transmit power control fields assigned to the mobile terminal within the different transmit power control messages.

As stated previously herein, the number of transmit power control messages for one mobile terminal could be equal to or smaller than the number of uplink component carriers configured for said one mobile terminal. If the number of transmit power control messages for one mobile terminal is smaller than the number of uplink component carriers configured for said one mobile terminal, grouping of the component carriers of a mobile terminal may be employed. The grouping of the component carriers of a mobile terminal can be based on different parameters e.g. based on at least on one of the following parameters:

interference conditions and power level on the assigned uplink component carrier,
the channel quality on the assigned uplink component carrier,
the bandwidth of the assigned uplink component carrier,
status of a load balancing function for the uplink component carriers,
the number of the transmit power control fields for a mobile terminal available at base station
the number of TPC RNTIs available at the base station,
the type of the assigned uplink component carrier, e.g. uplink anchor carrier and
the number of ACK/NACKs corresponding to the downlink data transmission that is to be signaled on the assigned uplink component carrier by the mobile terminal.

Similar to the first aspect of the invention, also in the embodiments related to the second aspect of the invention, there may be a power control command for all uplink component carriers of a mobile terminal. Accordingly, in another embodiment of the invention, one of the carrier group transmit power control commands is an all carrier transmit power control command to control the transmit power used by said one mobile terminal for transmissions on all uplink component carriers configured for the mobile terminal.

The all carrier transmit power control command for a mobile terminal may be for example included by the base station within the transmit power control field assigned to the mobile terminal within the first transmit power control message mapped to the control signaling region of the downlink component carrier.

In one exemplary implementation, the all carrier transmit power control command is mapped to a transmit power control message which is different from the power control message carrying other transmit power control commands for a mobile terminal. This may be for example beneficial in cases where the transmit power control command corresponding to individual/multiple up ink component carrier may not be used and/or to save downlink signaling overhead. Alternatively, in addition to the all carrier transmit power control command, the other transmit power control commands for one/multiple component carrier configured for the mobile terminal can be transmitted for fine tuning the all carrier transmit power control command for the individual component carrier(s)/group(s) of component carriers.

Further embodiments according to the second aspect of the invention also pertain to the operation of the mobile terminal. Accordingly, another embodiment of the invention provides a method for transmit power control on uplink component carriers of a mobile terminal within a OFDM based mobile communication system, in which the mobile terminal receives a sub-frame from a base station and performs within the received sub-frame a blind detection of plural transmit power control messages within a control signaling region of a downlink component carrier. Each of the transmit power control message comprises plural transmit power control fields of which one comprises a respective transmit power control command for the mobile terminal. The mobile terminal determines the transmit power control commands for the uplink component carriers configured for the mobile terminal from the respective one assigned transmit power control field within the transmit power control messages, and applies the transmit power control commands to uplink transmissions on the uplink component carriers configured for the mobile terminal.

In a further embodiment of the invention, one transmit power control field of each transmit power control message has a common index identifying its position within the transmit power control messages. The mobile terminal further receives a higher layer signal in message, e.g. a RRC message, from the base station that is informing the mobile terminal on the index of the transmit power control field within the transmit power control messages comprising the respective transmit power control commands for the mobile terminal.

It should be noted that different transmit power control field indices may be assigned to a mobile terminal in different transmit power control messages or a subgroup of the transmit power control messages may have common transmit power control field index. This more flexible signaling format may however increase the RRC signaling overhead.

Furthermore, in yet another embodiment of the invention, the mobile terminal receives from the base station a higher layer signaling message, e.g. RRC message, indicating a common and/or dedicated search space within the control signaling region of the sub-frame in which the mobile terminal is to perform blind decoding of control information (including the transmit power control messages).

Moreover, according to a further embodiment of the second aspect of the invention, at least one of the multiple transmit power control fields for the mobile terminal in the transmit power control messages may signal a carrier group transmit power control command for a subset of the uplink component carriers configured for the mobile terminal that is to be applied to all transmissions of by the mobile terminal on the subset of component carriers configured for the mobile terminal. The mobile terminal applies each carrier group transmit power control command to transmissions on the uplink component carriers of said group.

In a further embodiment of the invention, related to the use of an all carrier transmit power control command, one of the multiple transmit power control fields for the mobile terminal is signaling an all carrier transmit power command that is to be applied to all transmissions of by the mobile terminal on all component carriers configured for the mobile terminal. The mobile terminal applies the transmit power control commands comprises applying the all carriers transmit power control command to all transmissions on all uplink component carriers configured by the mobile terminal. Furthermore, in a more specific exemplary implementation, the mobile terminal applies to transmissions on a subset of uplink component carriers configured for the mobile terminal, a carrier group transmit power control command for said subset of the uplink component carriers in addition to an all carrier transmit power control command for all uplink component carriers configured by the mobile terminal.

As indicated already above, a third aspect of the invention that is independent from the first and second aspect of the invention is the idea of transmitting single commands for controlling the transmit power on plural component carriers, e.g. all component carriers or a group (subset) of component carriers of a mobile terminal. This third aspect allows to reduce the control signaling overhead due to transmit power control commands, as it allows to transmit less transmit power control commands than uplink component carriers configured for a mobile terminal. Hence, the transmit power on some component carriers of the mobile terminal may be jointly controlled. The different carrier group transmit power control commands may be transmitted in the same or different transmit power control messages.

In line with this third aspect of the invention, another embodiment of the invention provides a method for transmitting transmit power control commands from a base station to mobile terminals in a OFDM based mobile communication system using component carrier aggregation of plural component carriers, in which the base station is grouping for each mobile terminal, its plural configured component carriers in at least two groups of carriers. Furthermore, the base station generates for each mobile terminal, a carrier group transmit power control command for each group of carriers of the respective mobile terminal, and further generates a plurality of transmit power control messages each having a plurality of transmit power control fields assigned to the mobile terminals, wherein the carrier group transmit power control commands are included into the plurality of transmit power control fields. The base station further maps the transmit power control messages to control signaling region of a downlink component carrier, and transmits within a sub-frame the power control messages within a control signaling region of a downlink component carrier to the mobile terminals.

In line with the first and third aspect of the invention and according to a further embodiment, the carrier group transmit power control commands of one of the mobile terminals may be for example mapped to transmit power control fields within one transmit power control message. Furthermore, one of the carrier group transmit power control commands may be an all carrier transmit power control command to control the transmit power used by the respective mobile terminal for transmissions on all uplink component carriers of the mobile terminal. The all carrier transmit power control command may be for example included to the first transmit power control field assigned to the mobile terminal occurring in said one transmit power control message.

In line with the second and third aspect of the invention and according to another embodiment, each carrier group transmit power control command of a respective one of the mobile terminals is mapped to one transmit power control field within different transmit power control messages. Again, one of the carrier group transmit power control commands may be an all carrier transmit power control command to control the transmit power used by the respective mobile terminal for transmissions on all uplink component carriers of the mobile terminal. Furthermore, the all carrier transmit power control command may be included to the first transmit power control message within the control signaling region of the sub-frame. If the transmit power control message carries an all carrier transmit power control command, the other group/individual commands could be for example mapped to one or more different transmit power control messages.

According to a further aspect of the invention the implementation of the different embodiments of the invention in hardware and/or software is also suggested. Hence, the invention also provides a base station and a mobile terminal that are specifically adapted to perform the different implementations and embodiments of the methods described herein. In this respect, it should be noted that the base station and the mobile terminal may be respectively equipped with dedicated hardware circuitry or integrated circuits that perform the different functions. The base station and the mobile station may for example comprise a receiver for receiving various kinds of information to perform the transmit power control schemes outlined herein. Similar, the base station and the mobile terminal may also comprise a transmitter for transmitting various kinds of information to perform the transmit power control schemes outlined herein. Moreover, the base station and mobile terminal may also include a processor, such as for example a CPU or DSP, for processing the various kinds of information received or transmitted by the base station and mobile station so as to perform the transmit power control schemes outlined herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
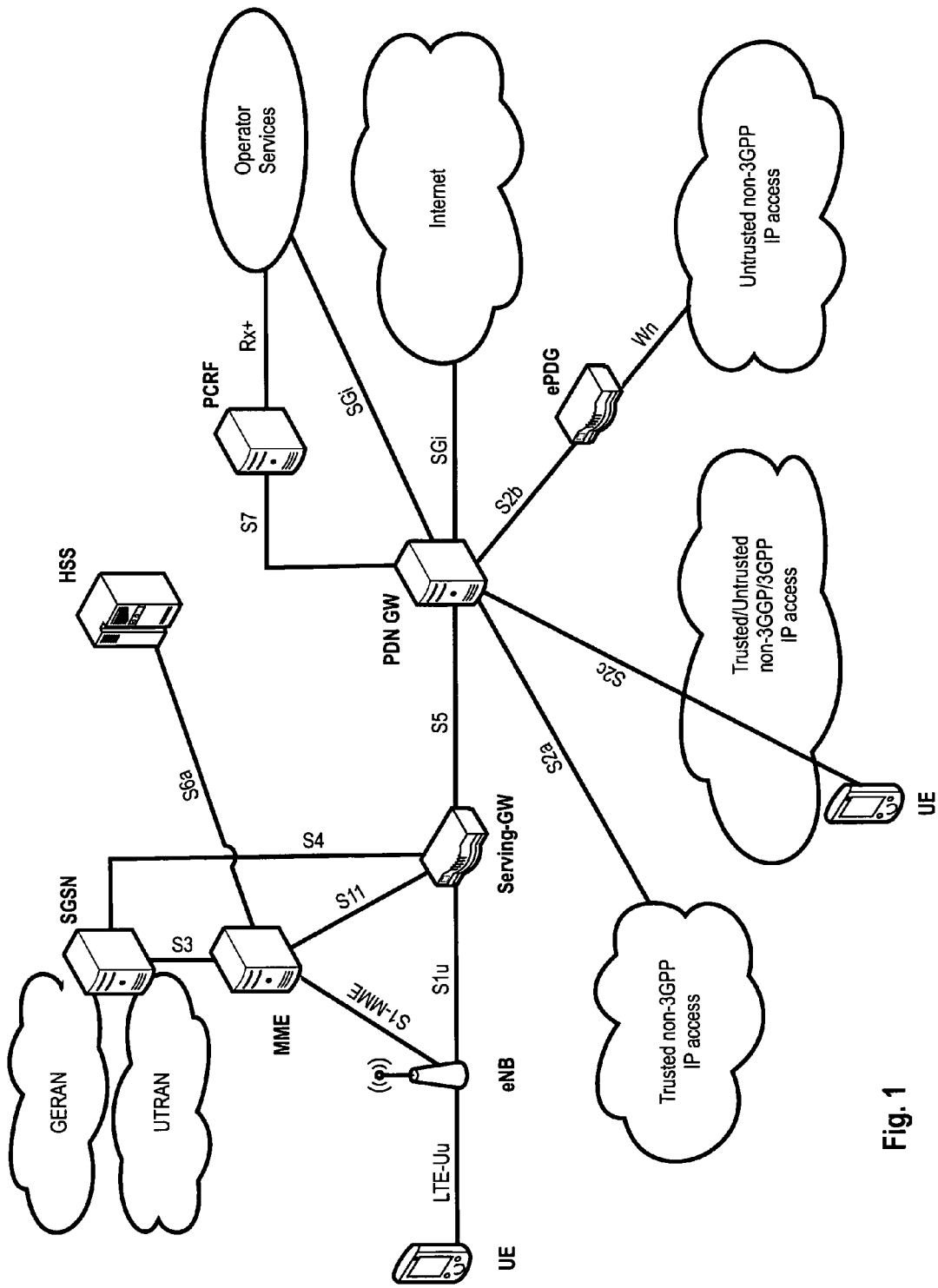
FIG. 1 shows an exemplary architecture of a 3GPP LTE system.
Figure 2:
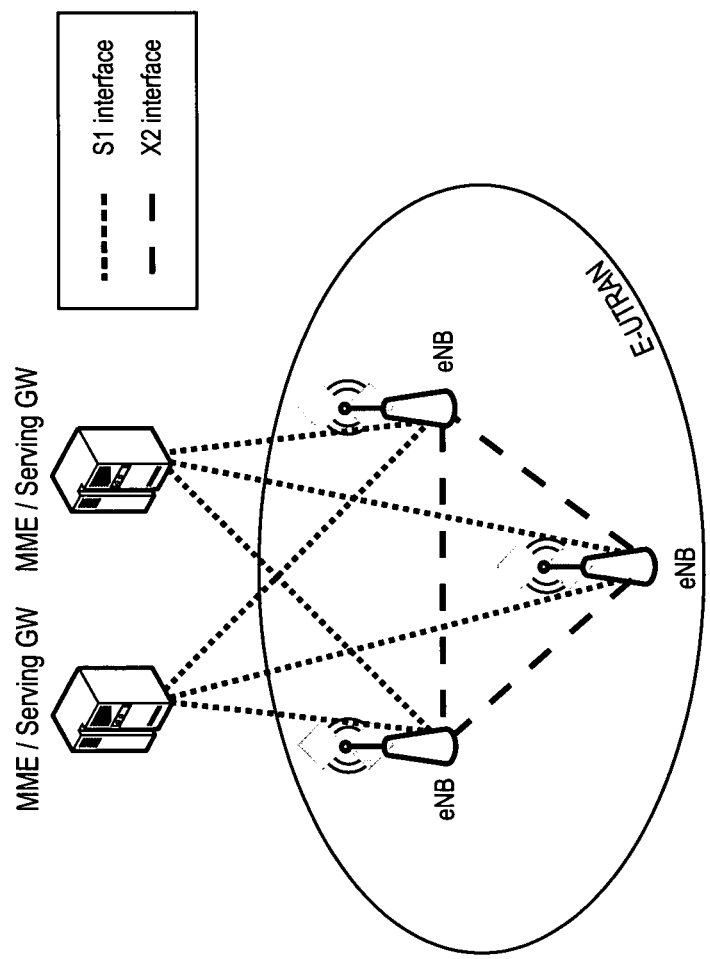
FIG. 2 shows an exemplary overview of the overall E-UTRAN architecture of 3GPP LTE.
Figure 3:
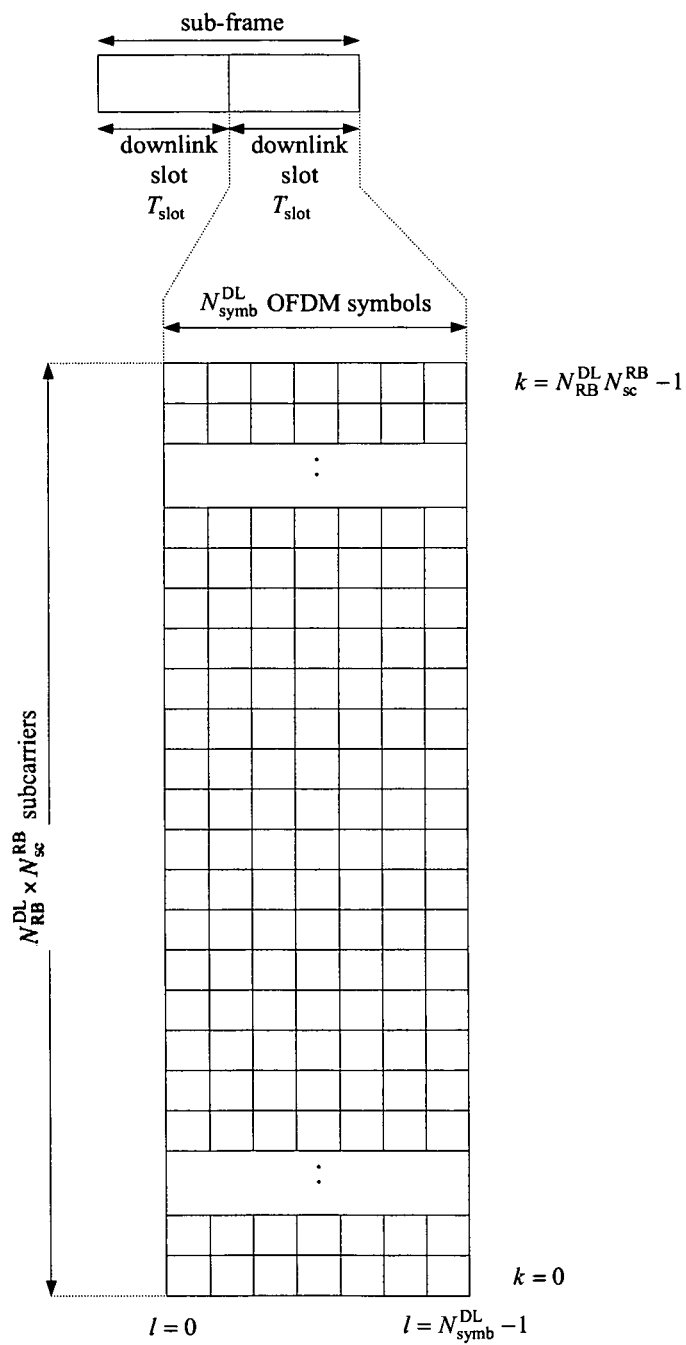
FIG. 3 shows an exemplary sub-frame structure on a downlink component carrier as defined for 3GPP LTE (Release 8)
Figure 4:
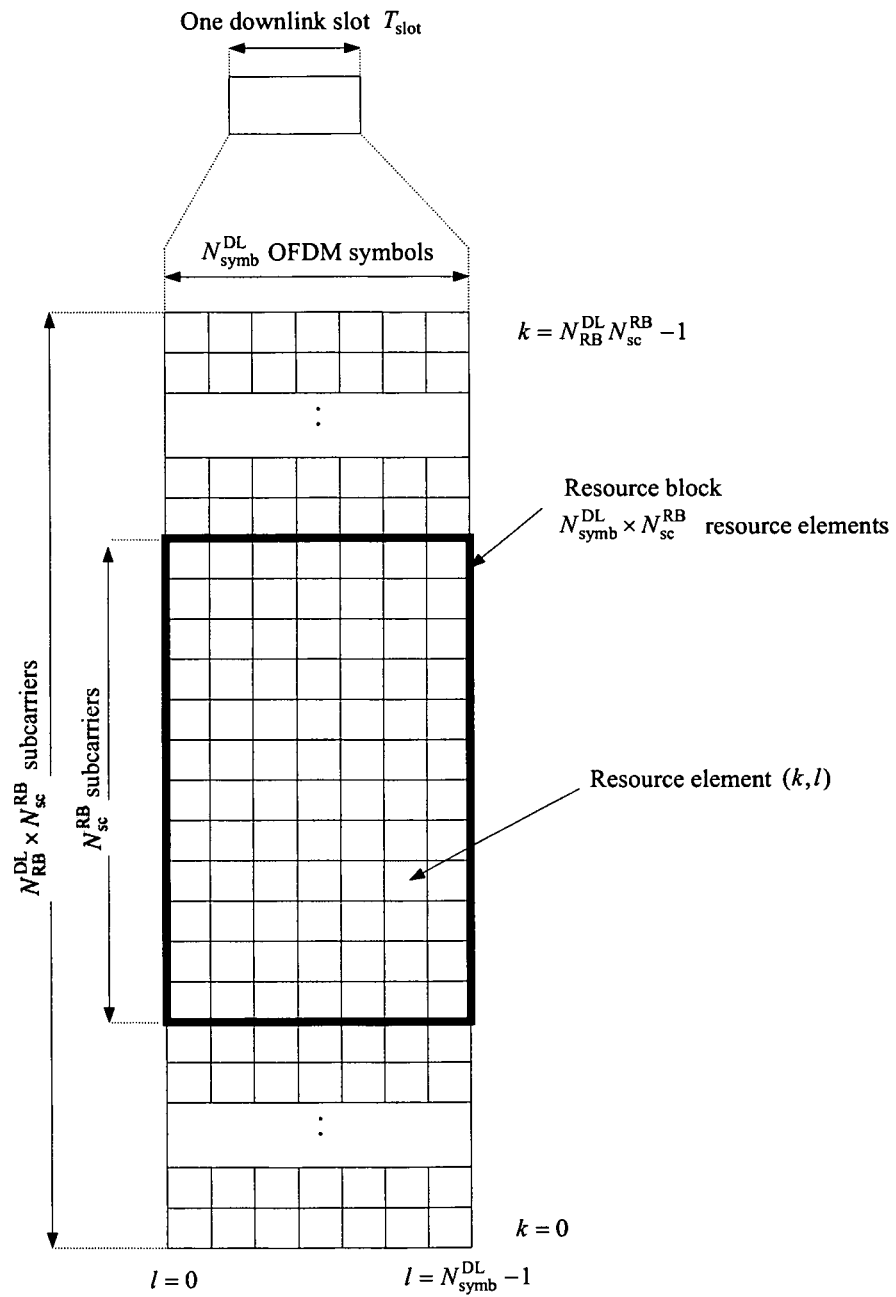
FIG. 4 shows an exemplary downlink resource grid of a downlink slot as defined for 3GPP LTE (Release 8)

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

As already indicated in the introduction portion of this document above, the mechanisms proposed for 3GPP LTE (Release 8) with respect to transmit power control may need some adaption and optimization for use in 3GPP LTE-A (Release 10). For example, considering the "reuse" of DCI formats 3/3A for in 3GPP LTE-A (Release 10), one solution that could be envisioned is that multiple PDCCHs with DCI format 3/3A according to 3GPP LTE (Release 8) are signaled to the user equipments on each downlink component carrier and provide a transmit power control command for the respective linked uplink component carriers—"linked uplink component carrier" means that each of the downlink component carriers has uplink component carriers linked to same, i.e. no identification of the uplink component carrier is needed to identify the uplink component carrier to which an uplink PDCCH is related on the respective downlink component carrier. This would be equivalent to performing a 3GPP LTE (Release 8) transmit power control for each uplink component carrier, i.e. perform 3GPP LTE (Release 8) transmit power control multiple times in parallel. However this potential solution initially considered by the inventors may not be efficient enough in cases of asymmetric downlink/uplink carrier aggregation (e.g. 2 downlink component carriers and 4 uplink component carriers) as it is not possible to control of multiple uplink component carriers. Furthermore, the user equipments' requirements with respect to processing power and battery usage due to requiring a linearly scaled number of blind decoding attempts; and signaling overhead appear not optimal.

Another potential solution considered by the inventors is to use the 3GPP LTE (Release 8) mechanisms for controlling transmit power for all configured uplink component carriers of the respective user equipment. Hence, each user equipment would still receive one transmit power control command using a 3GPP LTE DCI format 3/3A, i.e. a user equipment specific uplink TPC command is sent (in contrast to a component carrier specific control in the solution discussed above). Though this might be indeed optimal as the blind decoding, processing requirements and signaling overhead are to be unchanged in comparison to 3GPP LTE (Release 8), yet this would mean a significant limitation to the granularity of the TPC command as the component carriers could no longer be controlled individually.

A further potential solution that has been considered by the inventors, is to transmit the transmit power control commands of 3GPP LTE DCI format 3/3A using the Carrier Indicator Field (CIF). The use of the CIF has been already agreed for user equipment specific uplink and downlink DCI formats to support cross carrier scheduling. This field could also be extended by an implicit/explicit indication of power control commands for the cross scheduled uplink component carriers to enable transmit power control similar to the TPC commands provided in DCI format 3/3A of 3GPP LTE. However, uplink TPC commands for a specific component carrier are possible only if all user equipments have same component carrier index as the one addressed by the CIF, i.e. component carrier index labeling is done from system perspective. In case component carrier index labeling is done from a user equipment perspective, this solution may not prove efficient, since different user equipments grouped and addressed using a CIF including the TPC command may have a different component carrier index.

Signaling Format for TPC Commands—Type 1

According to a first aspect of the invention (multiple) transmit power control (TPC) commands for the uplink component carriers (UL CCs) configured for a mobile terminal (referred to as user equipment or UE in the 3GPP terminology) are provided to the mobile terminal within one transmit power control message. When implementing this aspect in a 3GPP based system, the power control message may be for example a PDCCH carrying DCI of a format based on the DCI format 3/3A for 3GPP LTE (Release 8). However, each DCI may comprise multiple TPC commands for a given mobile terminal.

Figure 5:
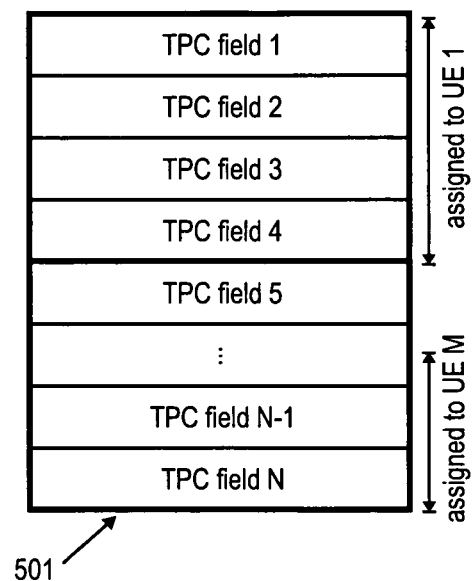
FIG. 5 shows an exemplary TPC message according to a first signaling format according to an embodiment of the invention.

An exemplary transmit power control message (TPC message) according to one exemplary embodiment of the invention is shown in FIG. 5. The exemplary TPC message 501 is based on the 3GPP LTE (Release 8) DCI format 3, respectively 3A, and contains a number of N TPC fields, each for carrying a respective TPC command. The size of the TPC field is for example 1 bit or two bits. As indicated in FIG. 5, multiple of the TPC fields ($K(UE_i)$ TPC fields) in the TPC message are assigned to respective ones of plural mobile terminals. For example, TPC fields 1 to 4 are assigned to a mobile terminal UE 1 and carry respective TPC commands for mobile terminal UE 1. Hence, as shown in FIG. 5, a group of mobile terminals (mobile terminals UE 1 to M) are assigned multiple TPC fields in the TPC message 501, respectively. The TPC fields 1 to N may carry different types of TPC commands as will be outlined below in further detail.

In one exemplary implementation, the mobile terminals are respectively assigned one TPC field for each component carrier configured for the respective mobile terminal in the uplink. Hence, in this case $K(UE_i)$ would be equal to the number of component carriers configured for the mobile terminal in the uplink. In this context it should be noted that mobile terminal/user equipment may be configured to transmit data on one or more component carriers. Hence expressions like "component carriers configured for the mobile terminal/user equipment" or "component carriers aggregated by the mobile terminal/user equipment" denote the component carriers configured for use by the mobile terminal/user equipment. These "configured component carriers" may be either the component carrier(s) the mobile terminal/user equipment is capable of using (e.g. due to hardware restrictions), or one or plural (e.g. a subset (group)) of the uplink carriers that can be received by the base station/eNodeB serving the mobile terminals/user equipments, i.e. that are "available". Please note that the network, e.g. the base station/eNodeB may use control signaling (e.g. RRC signaling) to configure the subset (group) of component carriers on which a respective mobile terminal/user equipment can be assigned resources for uplink transmission, thereby defining the "component carriers configured for the mobile terminal/user equipment".

Furthermore, the TPC message 501 is signaled within the control signaling region (i.e. a given number of OFDM symbols within the sub-frame dedicated to carry control information) of a downlink component carrier. A group of mobile terminals served by a base station is assigned respective multiple transmit power control fields in the transmit power control message as mentioned above. If not all mobile terminals in a base station's coverage can be assigned TPC fields in a single TPC message, the base station generates plural of these messages for respective groups of mobile terminals. Moreover it should be noted that each mobile terminal/user equipment may be assigned consecutive TPC fields (indices) so as to simplify the signaling for assignment of the TPC fields, and/or even reduce the signaling overhead. Alternatively, the fields may be assigned according to a given pattern, based on a "base index" of the first TPC field assigned to the mobile terminal/user equipment (e.g. the mobile terminal/is assigned $K(UE_i)$ fields in the message, wherein the first TPC field has a base index i, and the other $K(UE_i)-1$ TPC field are provided at predefined offsets to the base index i (e.g. every $n^{th}$ field relative to base index is assigned to the mobile terminal).

Figure 6:
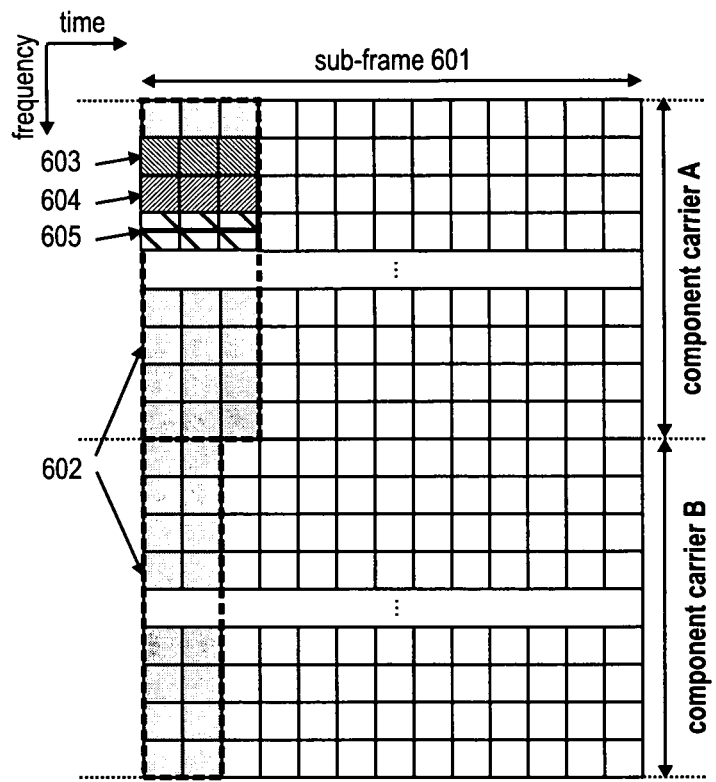
FIG. 6 shows the transmission of multiple TPC messages according to a first signaling format according to an embodiment of the invention.
Figure 6:
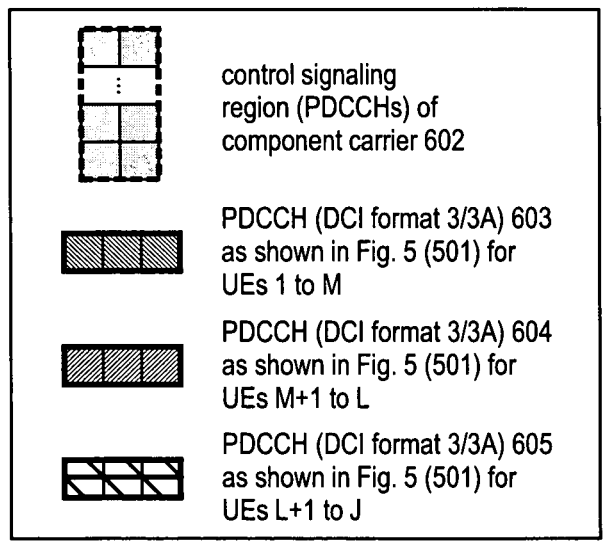

FIG. 6 is highlighting the transmission of multiple TPC messages as shown in FIG. 5 within a single sub-frame on a downlink component carrier according to an exemplary embodiment of the invention. The sub-frame as such spans all downlink component carriers available to the base station, but is logically divided into plural OFMD symbols in the time domain on respective component carriers (A and B) in the frequency domain. The component carriers A and B span a certain range of sub-bands that define the bandwidth of the respective component carrier. Some of the OFDM symbols within the sub-frame on each component carrier are dedicated to control signaling. For example, on component carriers A there are 3 OFDM symbols that form the control signaling region 602, and there are 2 OFDM symbols that form the control signaling region 602 of component carrier B.

It is assumed for exemplary purposes that the base station/eNode B generates three different TPC control messages 603, 604, 605 for respective groups of mobile terminals. Each of the TPC control messages has a format as shown in FIG. 5. The TPC control messages are denoted "PDCCH (DCI format 3/3A)" in FIG. 6, to indicate that the TPC messages as such are a special format of downlink control information (DCI) sent as a PDCCH on the downlink.

In order to be able to address the different TPC messages 603, 604, 605 to the mobile terminals/user equipments belonging to the different groups of mobile terminals, each TPC message 603, 604, 605 comprises in addition to the TPC fields a CRC that is masked with one of plural temporary identifiers reserved in the system for transmit power control signaling. In a 3GPP radio network, such as LTE-A, the temporary identifiers are Radio Network Temporary Identifiers (RNTIs) specifically provided for transmit power control (TPC), i.e. so called TPC RNTIs. Hence, the CRC of each of the TPC messages is scrambled/masked with a respective one of the TPC RNTIs prior to its inclusion to the TPC message. The mobile terminals/user equipment of the different groups of mobile terminals blind decodes the payload size of the TPC message and use a respective one of the TPC RNTIs to descramble the CRC with the given TPC RNTI. Based on the descrambled CRC information contained in the TPC messages, the mobile terminal determines whether the message payload (i.e. the TPC fields) have been successfully decoded and are destined to the mobile terminal. If so, the respective mobile terminals of a group assume that the TPC message has been addressed to them, as otherwise the CRC check would fail due to having used an incorrect TPC RNTI for descrambling the CRC information.

This way, the different TPC messages may be addressed to the different mobile terminals/user equipments. The individual mobile terminals/user equipments may be informed on the TPC RNTI to use for the detection of the TPC messages destined to them by sending a RRC message from the base station to the respective mobile terminals that indicates the TPC RNTI to be used. Furthermore, the same or a different RRC signaling message may be used by the base station to indicate to a respective mobile terminal/user equipment, which TPC fields in a TPC message contain TPC commands for the given mobile terminal/user equipment.

As can be seen from the FIG. 6, the TPC commands for a mobile terminal are provided within single TPC message. On the other words, the TPC commands for this mobile terminal may be confined within single PDCCH DCI format 3/3A. This exemplary implementation still has the full flexibility to provide multiple TPC commands simultaneously within single sub-frame.

Regarding the RRC signaling overhead of the TPC command signaling scheme discussed above, it is assumed for exemplary purposes that there are five uplink component carriers configured for user equipment. Hence, it can be assumed that five (consecutive) TPC fields are reserved for the user equipment in one TPC message. As indicated above, in case the TPC fields are assigned consecutively or with a known pattern within a TPC message, it is sufficient to signal an index of one TPC-field and the TPC-RNTI of the TPC message. This TPC field could be for example the starting TPC field index for the mobile terminal. The mobile terminal is usually aware of number of uplink component carriers configured for it. Hence, in case the eNodeB signals the starting TPC-field-index as TPC field 1, and the user equipment is configured for 5 uplink component carriers, the mobile terminal assumes that TPC-field 1 to TPC field 5 are assigned to it. Thus in this case, although TPC commands are provided for all component carriers configured for the user equipment, the signaling overhead is similar to that of 3GPP LTE (Release 8). Thus, in this exemplary implementation, the RRC signaling overhead for assigning the TPC fields to a user equipment would be 6 bits for the TPC-RNTI and 4 bits, respectively 5 bits for the TPC-field index (when reusing DCI format 3, respectively 3A of LTE (Release 8)). The RRC signaling message for the TPC fields assignment is this either 20 bits or 21 bits, as shown in FIG. 11.

Figure 11:
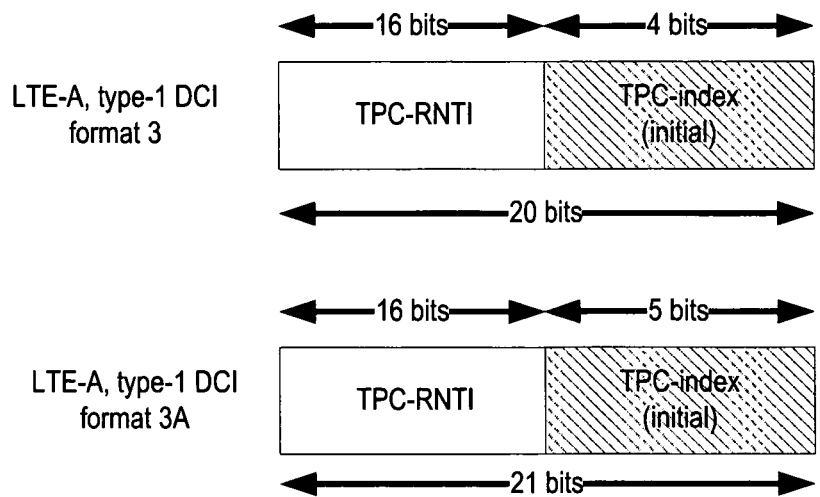
FIGS. 11 & 12 show two different RRC messages for assigning TPC fields to a mobile terminal according to different embodiments of the invention.

The Abstract Syntax Notation (ASN) for the RRC message in FIG. 11 is shown below:

```
-- ASN1START
TPC-PDCCH-Config::=        CHOICE {
    release                    NULL,
    setup                      SEQUENCE {
        tpc-RNTI                   BIT STRING (SIZE (16)),
        tpc-Index                  TPC-Index__initial
    }
}
TPC-Index ::=              CHOICE {
    indexOfFormat3             INTEGER (1..15),
    indexOfFormat3A            INTEGER (1..31)
}
If the UE has multiple UL CCs, CC1..CCN
Tpc-index-CC 1 = TPC-index__initial
Tpc-index-CC 2 = TPC-index__initial + 1
Tpc-index-CC 3 = TPC-index__initial + 2
.
.
.
Tpc-index-CC N = TPC-index__initial + (N–1)
-- ASN1STOP
```

Figure 12:
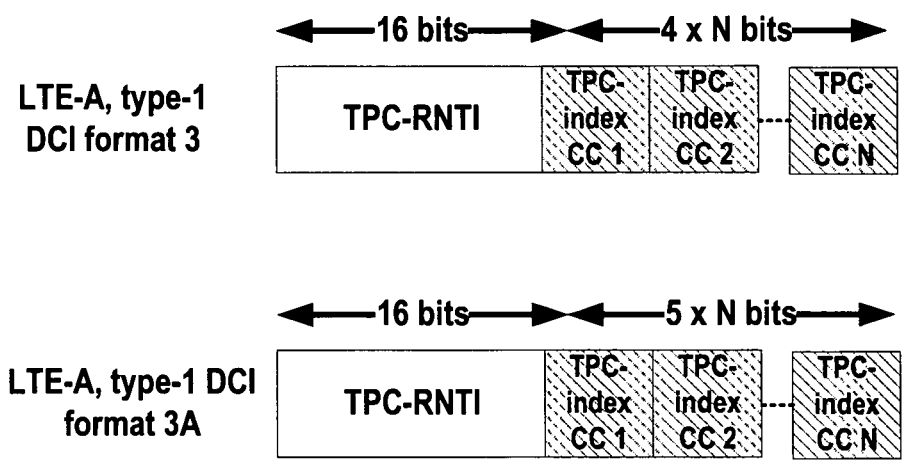

In case non-consecutive fields are assigned according to no given pattern, the eNodeB would need to use additional bits to indicate the assigned fields individually. In this case, to configure the TPC indices assigned to a user equipment the signaling overhead increases proportionally with the number $N_{CC}$ of component carriers (CCs), which would be still less overhead than in signaling $N_{CC}$ times TPC-RNTI and TPC index if the TPC fields could be assigned in any TPC message sent by the eNodeB. An exemplary signaling message for the TPC fields assignment where the user equipment can be assigned $N_{CC}$ TPC fields in an arbitrary fashion is shown in FIG. 12. An ASN representation of the RRC message in FIG. 12 is shown below:

```
-- ASN1START
TPC-PDCCH-Config::=        CHOICE {
    release                    NULL,
    setup                      SEQUENCE {
        tpc-RNTI                   BIT STRING (SIZE (16)),
        tpc-Index                  TPC-index{CC1, CC2 ...CCN}
    }
}
TPC-Index ::=              CHOICE {
    indexOfFormat3             INTEGER (1..15) (4 bits for
    each CC),
    indexOfFormat3A            INTEGER (1..31) (5 bits for
    each CC)
}
-- ASN1STOP
```

Furthermore, it should be noted that there may also be some intermediate solution between assigning consecutive TPC fields within a message/TPC fields according to a given pattern, and the other extreme of allowing full flexibility in assigning the TPC fields of a single TPC message, e.g. different subsets of uplink component carriers configured for the user equipment having consecutive TPC indices.

As indicated previously, the mobile terminals may for example detect the TPC message(s) by means of blind decoding. As each mobile terminal would receive all TPC commands in a single TPC message, only TPC RNTI needs to be checked. Hence, the blind detection complexity is similar to 3GPP LTE (Release 8).

Signaling Format for TPC Commands—Type 2

In the examples described above with respect to FIGS. 5, 6, 11 and 12, it has been assumed that all TPC commands for a mobile terminal are included into one TPC message (of potentially plural TPC messages) sent by a base station. A further, second aspect of the invention is related to another signaling format of the TPC commands for uplink component carriers configured for a mobile terminal: The transmit power commands to be transmitted to a given mobile terminal are included into different TPC messages respectively, so that one transmit power control command is transmitted in a respective (one) TPC message. Accordingly, one TPC field in each transmit power control message is assigned to a respective single mobile terminal.

Figure 9:
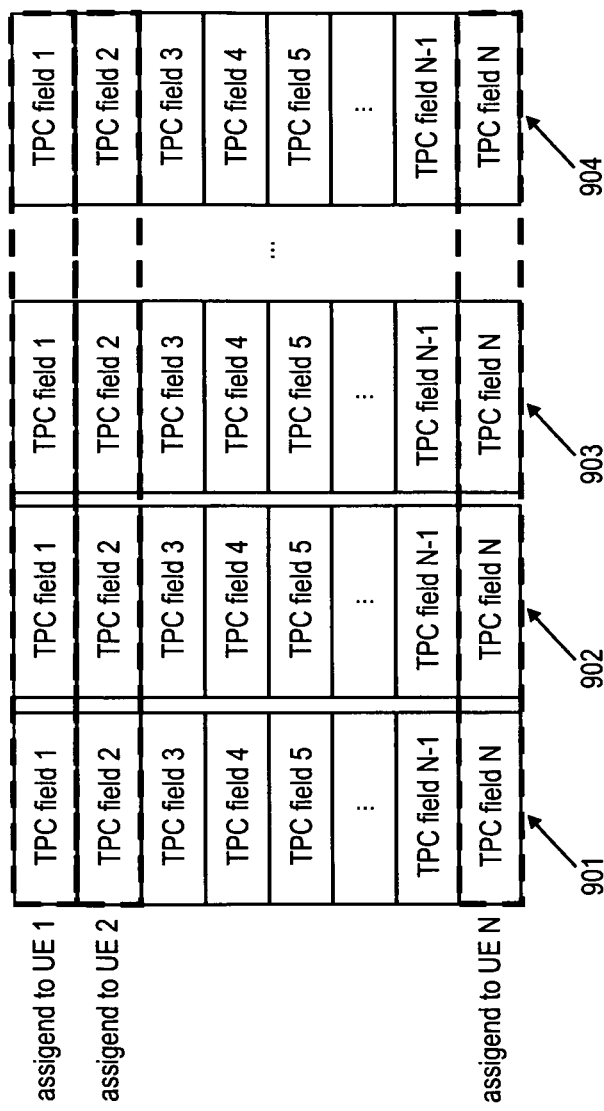
FIGS. 9 & 10 show the use of TPC messages for signaling TPC commands according to a second signaling format and according to different embodiments of the invention.

This format for signaling the TPC commands to a mobile terminal is exemplified in FIG. 9. The TPC messages 901, 902, 903, 904 may for example be configured as in 3GPP LTE (Release 8), e.g. have a format 3 or 3A as outlined in the Technical Background section. The base station ensures however that each of the mobile terminals for which transmit power commands need to be signaled is assigned respective single TPC fields in the different TPC fields. For example, a respective mobile terminal is assigned the TPC field with the same index in plural TPC messages. This is exemplified in FIG. 9, where the mobile terminal UE 1 is assigned the TPC field 1 in the TPC messages 901, 902, 903, 904, mobile terminal UE 2 is assigned the TPC field 2 in the TPC messages 901, 902, 903, 904, etc. Of course, similar to the TPC signaling discussed with respect to FIGS. 5, 6, 10 and 11 above, alternatively, the index of the TPC field assigned to a respective mobile terminal may vary from TPC message to TPC message according to some known pattern or scheme, for example, by using a certain offset relative to a base index defined for the TPC field assigned to the mobile terminal in the first TPC message 901.

Moreover, it should be noted that a single mobile terminal may not necessarily be assigned a TPC field in each of the TPC messages. As already discussed above, the number of TPC fields is mainly depending on the number of component carriers configured for a given mobile terminal. Considering the example of FIG. 10, a scenario is shown, where a mobile terminal UE 2 is only assigned two TPC fields in the first two TPC messages 901, 902, while another mobile terminal UE 3 is assigned the remaining TPC fields in TPC messages 902, 903 at the same index position.

Assuming that a mobile terminal is configured with $K(UE_i)$ uplink component carriers, the respective mobile terminal is to be assigned $K(UE_i)$ TPC-RNTIs. The TPC field index within each TPC message (for each TPC-RNTI) may be the same or a "base index" is signaled as indicated above. Further the Type 2 signaling format provides lower overhead in terms of RRC signaling when controlling multiple mobile terminals for a specific uplink component carrier simultaneously. An exemplary scenario could be in case where the whole uplink component carrier interference scenario changes. In this case the base station may transmit a TPC command for all mobile terminals having configured this uplink component carrier. Using the Type 2 signaling format, the number of mobile terminals addressed within a single TPC message is higher than in case of using the Type 1 signaling format. Hence, with a single TPC message more mobile terminals connected to the uplink component carrier could be addressed Assuming again that a mobile terminal is configured with five uplink component carriers, the mobile terminal is assigned five TPC-fields in five TPC messages using five TPC-RNTIs. Since only one TPC field index may be signaled to assign TPC fields in several consecutive TPC messages, it may be sufficient to signal only one TPC field index and the TPC-RNTI of the first TPC message. As the mobile terminal is aware of the number $K(UE_i)$ of configured uplink component carriers, it can conclude on the further TPC RNTIs for the other TPC messages. For example, the TPC RNTIs available may be provided or known to the mobile terminal and have a certain order. By indicating the "starting" TPC RNTI of the first TPC message, the mobile terminal may conclude that it is assigned to the next $K(UE_i)-1$ TPC RNTIs as well. For example, a base station may signal a starting TPC-RNTI index indicating TPC RNTI 1. The mobile terminal would be aware that it is configured for five uplink component carriers, so that it assumes that TPC-RNTI 1 to TPC RNTI 5 are assigned to it.

Hence, also in this alternative type of signaling TPC commands of a mobile terminal in multiple TPC messages, there is no signaling overhead for assigning the TPC fields in the different TPC messages to a mobile terminal in comparison to 3GPP LTE (Release 8). Furthermore, the RRC signaling format as shown in FIG. 11 could be used. Furthermore, if the mobile terminal is assigned a TPC field in non-consecutive TPC messages, the RRC signaling message for the TPC fields assignment may for example indicate a TPC field (base) index of the TPC fields and each TPC RNTI to be used by the mobile terminal. An ASN representation of the RRC message format in FIG. 11 is shown below:

```
-- ASN1START
TPC-PDCCH-Config::=        CHOICE {
    release                NULL,
    setup                  SEQUENCE {
        tpc-RNTI_initial   BIT STRING (SIZE (16)),
        tpc-Index          TPC-Index
    }
}
TPC-Index ::=              CHOICE {
    indexOfFormat3         INTEGER (1..15),
    indexOfFormat3A        INTEGER (1..31)
}
If the UE has multiple UL CCs, CC1..CCN
UL CC 1 = {TPC-RNTI-initial, TPC-Index}
UL CC 2 = {TPC-RNTI-initial + 1, TPC-Index}
UL CC 3 = {TPC-RNTI-initial + 2, TPC-Index}
.
.
.
UL CC N = {TPC-RNTI-initial + (N–1), TPC-Index}
-- ASN1STOP
```

Figure 10:
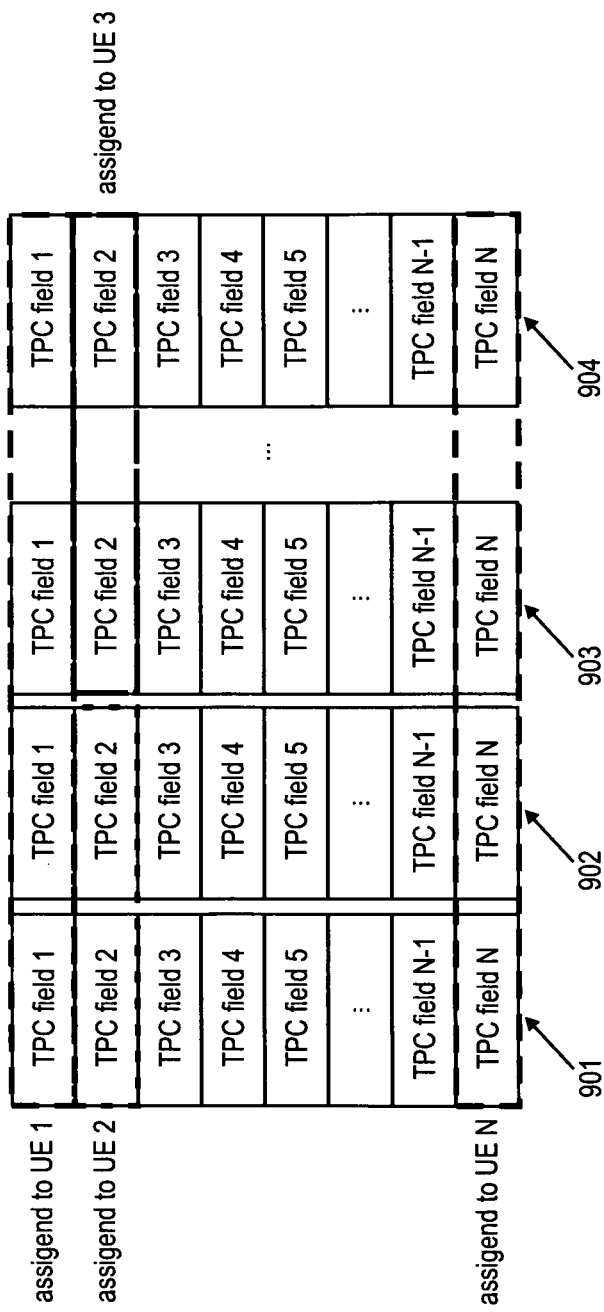

In the examples outlined with respect to FIG. 9 and FIG. 10, the mobile terminal would receive multiple TPC messages (multiple PDCCHs) which signals multiple TPC commands and use multiple TPC-RNTIs. Hence, blind detection complexity is linearly increasing with the number of assigned TPC fields, respectively the number of uplink component carriers configured for a mobile terminal.

The discussion of FIGS. 5, 6, 9, 10, 11 and 12 above has mainly focused on two different types of signaling the plural TPC commands per mobile terminal. It should be noted that the two signaling formats may also be readily combined with each other. For example, a mobile terminal may be assigned multiple TPC fields in respective multiples of TPC messages. Alternatively, the base station may decide to switch between the two TPC signaling formats depending on some use scenario applying the majority of the mobile terminals in its cell. For example, if the mobile terminals mainly use small aggregation sizes (e.g. are configured with 1, 2 or 3 uplink component carriers) the Type 1 signaling format may be used, while for other aggregation sizes, the Type 1 signaling format could be used.

In another example, a mobile terminal could be assigned a number of G consecutive TPC fields at given index positions in H consecutive TPC messages, still a format as shown in FIG. 11 could be used to signal the assignment of the TPC fields, given that the numbers G and H are known to the mobile terminal. If same are not known, a signaling format as shown in FIG. 12 could be used where the base station indicated the starting TPC RNTI and the TPC fields in each message, while the mobile terminal may determine the number of TPC RNTIs to use based on its number of configured uplink component carriers and the number G of TPC fields in each TPC message, for example by calculating $$H = \left\lceil \frac{K(UE_i)}{G} \right\rceil,$$

wherein the function $\lceil x \rceil$ provides the next higher integer number of x. It should be understood, that the more flexible and irregular the assignment of TPC fields across the TPC messages is, the higher the signaling overhead for the assignment.

Component Carrier Grouping

In the previous examples, there has been a TPC command per component carrier configured for a given mobile terminal. In the following, another, third aspect of the invention is discussed. This third aspect is based on the idea of transmitting single commands for controlling the transmit power on plural component carriers, e.g. all component carriers or a group (subset) of component carriers of a mobile terminal. Hence, the transmit power on some component carriers of the mobile terminal may be jointly controlled. This third aspect allows to reduce the control signaling overhead as the assignment of the TPC field may be simplified and less information may need to be signaled (depending on the assignment scheme of the TPC fields), as the third aspect of the invention allows to transmit less transmit power control commands than uplink component carriers configured for a mobile terminal.

The use of grouping of carriers and providing respective carrier group TPC commands is especially beneficial not with respect to the control signaling overhead. In the Type 1 and Type 2 signaling format, all TPC commands/TPC messages may be transmitted on a single downlink component carrier. If the base station is serving a large number of mobile terminals all aggregating a high number of uplink component carriers (e.g. all available uplink component carriers), the number of TPC commands and thus also the number of TPC messages to be signaled in the PDCCH region of the downlink component carrier is high and may imply some limitation to the signaling of other control information in the PDCCH region, e.g. broadcast information. Therefore, it may be desirable to reduce the number of TPC commands to be signaled for the mobile terminals served by a base station.

The idea underlying this third aspect may be applied to any signaling format for providing TPC commands for plural uplink carriers to a mobile terminal. In particular, the idea underlying this third aspect may be readily used with one of the different signaling formats for TPC commands as discussed herein. For simplicity, the signaling format for TPC commands that has been exemplified with respect to FIGS. 5 and 6 above, will be referred to as "Type 1 signaling format" in the following, while the signaling format for TPC commands that has been exemplified with respect to FIGS. 9 and 10 will be referred to as "Type 2 signaling format" in the following.

One exemplary embodiment in line with the third aspect of the invention is the introduction of an "all carrier" TPC command, i.e. a single TPC command that is applying to all component carriers configured for a mobile terminal. One of the multiple TPC fields assigned to a mobile terminal in the Type 1 or Type 2 signaling format discussed above is carrying this all carrier TPC command. An all carrier TPC command may be for example especially applicable for fast moving mobile terminals. For those terminals the channel quality on all component carriers is likely to experience similar fading, so that one single TPC command may apply to all component carriers. The all carrier TPC command (and also the carrier group TPC commands discussed below) may however also simply used as a measure to reduce the signaling overhead and/or blind decoding efforts of mobile terminal as will be outlined below in further detail.

In addition to or alternatively to the all carrier TPC command, there may also be one or more TPC commands controlling the transmit power for a subset of the component carrier configured for a mobile terminal. This type of command is referred to as a carrier group TPC command herein— essentially, the all carrier TPC command may be considered a special carrier group TPC command.

Consider for example a mobile terminal with five component carriers configured in uplink and that there are also four TPC fields assigned to the mobile terminal. This means that the mobile terminal has multiple TPC fields in same or different TPC massages. In this case, the TPC fields could be used to signal different types of commands. For example using a Type 1 signaling format as shown in FIG. 5, the TPC field 1 could carry a TPC command for all uplink component carriers (component carriers 1 to 5) configured by the mobile terminal, TPC field 2 could carry a TPC command for component carrier 1 only, TPC field 3 is carrying a carrier group TPC command for component carriers 2 and 3, while TPC field 4 provides a TPC command for component carrier 4 of the mobile terminal.

There are different possibilities, how the all carrier TPC command is used by a mobile terminal. In a first example, the all carrier TPC command would be applied by the mobile terminal to control transmit power of all transmissions on all uplink component carriers for which no individual TPC command or carrier group TPC command is received. In the example given above, this would mean that "only" the transmit power of component carrier 5 is controlled by the all carrier TPC command, while the transmit power on the respective other component carriers 1 to 4 of the mobile terminal are controlled by the respective individual TPC commands in TPC field 1 and TPC field 4 and the carrier group TPC command in TPC field 2 of the TPC message.

In another example, the all carrier TPC command would be applied by the mobile terminal to control transmit power of all transmissions on all uplink component carriers, and the further individual TPC commands and/or carrier group TPC commands provide an additional offset relative to the all carrier TPC command to be applied by the mobile terminal to the transmit power for the individual component carrier, respectively group of component carriers.

To further reduce the number of TPC commands per mobile terminal, there may for example be only two or three TPC fields assigned to one mobile terminal in the TPC message(s) sent by the base station. In one embodiment of the invention, all TPC commands are carrier group TPC commands. In a further embodiment, one TPC command is an all carrier TPC command and the remaining TPC command(s) are carrier group TPC commands.

Figure 7:
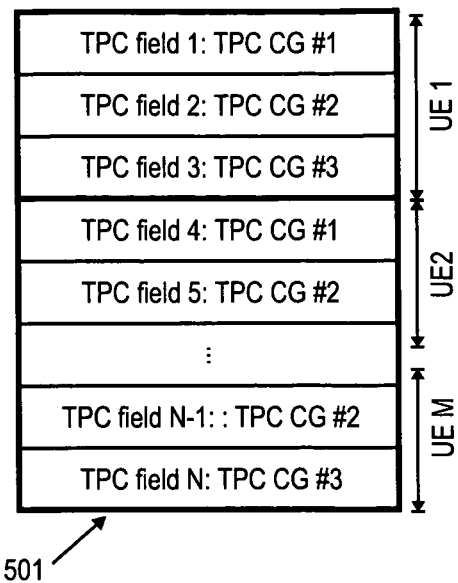
FIGS. 7 and 8 show different exemplary uses of the TPC field of a TPC message according to a first signaling format according to different embodiments of the invention.
Figure 8:
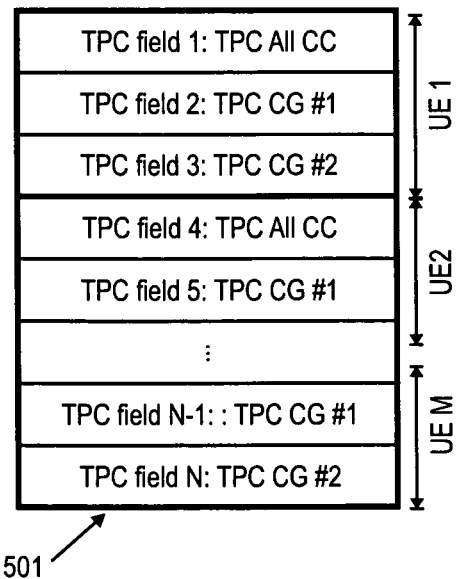

FIG. 7 highlights one exemplary TPC message according to the Type 1 signaling format, where the mobile terminal UE 1 is assigned three TPC fields in the TPC message 501 and where each TPC field assigned to the mobile terminal UE 1 is carrying a carrier group (CG) TPC command for a given carrier group #i (TPC CG #i). FIG. 8 shows another exemplary TPC message according to the Type 1 signaling format, where the first TPC field assigned to the mobile terminal UE 1 is carrying an all carrier TPC command (TPC All CC), while the other TPC fields of mobile terminal UE 1 in the TPC message are carrier group commands (TPC CG #i).

Figure 13:
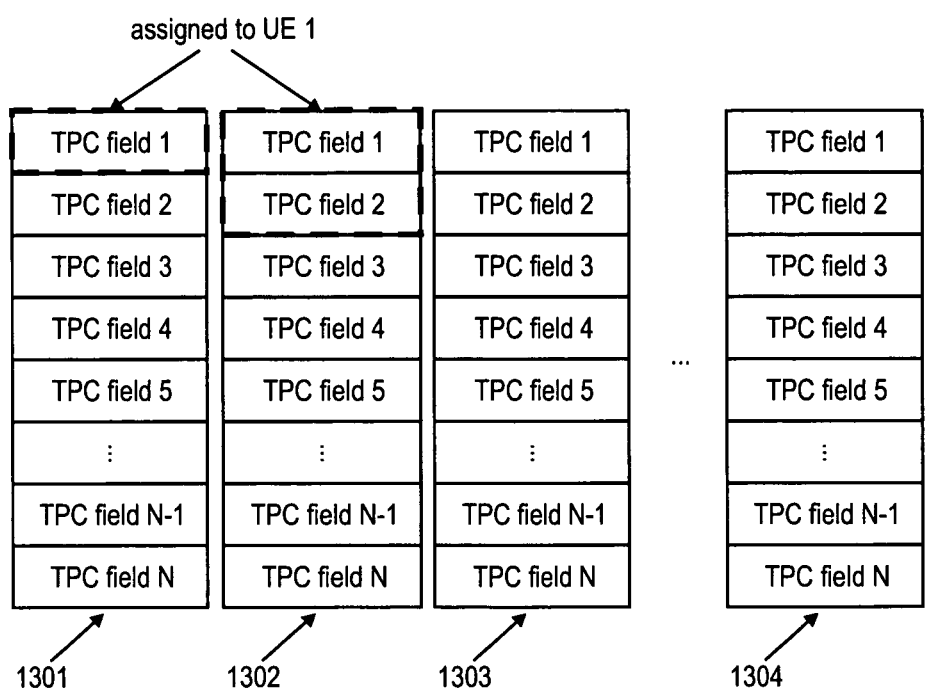
FIG. 13 shows an exemplary signaling of TPC commands using a mix of a first and second signaling format for providing TPC commands according to another embodiment of the invention, and FIG. 14 exemplifies the configuration of different dedicated or common search spaces by a base station according to an exemplary embodiment of the invention.

In one embodiment of the invention, as exemplified in FIG. 13, the first TPC message 1301 (associated to a first TPC RNTI) within the control signaling region of a downlink component carrier comprises one TPC field for a mobile terminal UE 1 and provides an all carrier TPC command for the respective mobile terminal. A further second TPC message 1302 comprises one or more TPC fields (in the example of FIG. 13, two TPC fields: TPC fields 1 and 2) assigned to the mobile terminal UE 1 and is providing carrier group TPC commands and/or TPC commands for individual component carriers configured for the mobile terminal.

The grouping of the component carriers configured by a mobile terminal at the base station may be based on several parameters. The grouping of the component carriers of a mobile terminal can be based on different parameters e.g. based on at least on one of the following parameters:
  interference conditions and power level on the assigned uplink component carrier,
  the channel quality on the assigned uplink component carrier,
  the bandwidth and/or frequency band of the assigned uplink component carrier,
  status of a load balancing function for the uplink component carriers,
  the number of the transmit power control fields for a mobile terminal available at the base station
  the number of TPC RNTIs available at the base station,
  the type of the assigned uplink component carrier, e.g. uplink anchor carrier and
  ACK/NACKs signaling for downlink data transmission on the uplink component carrier by the mobile terminal.

For example, in case of a fast moving mobile terminal (e.g. if located in a train or car), it is likely that the different uplink component carriers configured for the mobile terminal experience related fading. Hence, the interference situation on the configured component carriers and thus the channel quality may be closely related, so that the use of an all carrier TPC command may be adequate to control all component carriers configured at the mobile terminal simultaneously and to fine tune individual component carriers by sending individual TPC commands in the remaining TPC fields.

Also the bandwidth and/or frequency band of the aggregated uplink component carriers may be considered. For example, component carriers that have a small bandwidth (e.g. 5 MHz) and the frequency bands of which are close together may be grouped and jointly power controlled by carrier group commands.

Another parameter that may be relevant is the number of the transmit power control fields for a mobile terminal (or the mobile terminals) available at the base station. For example, there may be a system limitation on the maximum number of TPC commands that the base station can transmit in each sub-frame on a given downlink component carrier, which may imply a imitation to the number of TPC field that can be assigned to each mobile terminal in order to allow transmit power control of all mobile terminals served by the base station.

A somewhat similar restriction may be implied by the TPC RNTIs available at the base station which is essentially defining the number of TPC messages the base station can signal in one sub-frame. Again, this may have an implication on the number of TPC fields per mobile terminal, when ensuring that each mobile terminal receives at least one TPC command per sub-frame.

Another parameter for grouping of the component carriers may be the type of the assigned uplink component carrier. For example, one or more of the uplink component carriers may be anchor uplink component carriers, which should be power controlled individually. Hence, it would be advantageous, if the anchor component carrier of a mobile terminal in the uplink may be controlled by an individual TPC command, while the other component carriers may be further grouped based on other parameters or may be combined in a single carrier group for which a carrier group TPC command is sent.

A further parameter may be the ACK/NACKs signaling for downlink data transmission on the uplink component carrier by the mobile terminal. For example, the ACK/NACK signaling for the downlink data may be provided on one or more uplink component carriers of the mobile terminal. If reusing DCI format 3/3A for the TPC messages as discussed above, it may be assumed that the DCI formats that grant resources of ACK/NACK signaling on the PUCCH may overwrite the TPC command for the given uplink component carrier(s) provided by DCI format 3/3A TPC messages. Hence, those uplink component carriers could be grouped in a separate carrier group, while the other component carriers may be individually power controlled by individual TPC commands, if the number of TPC fields that can be assigned to the mobile terminal is sufficient.

Further Signaling Aspects

In the discussion above, there have been examples given what information the RRC message signaled by the base station need to comprise in order to assign certain TPC fields in one or more TPC messages to a mobile terminal. Basically, this has been an indication of the assigned TPC fields by signaling one or more TPC field indices and one or more TPC RNTI to be used by the mobile terminal, in order to assign TPC fields in one or more TPC messages to the mobile terminal.

In case no grouping of component carriers is used, i.e. the TPC message(s) comprise respective TPC commands for each component carrier configured for a mobile terminal, the mapping of the TPC commands to the uplink component carriers to which they pertain within the mobile terminal may be for example realized by the base station and the mobile station using some mutual sorting criterion or criteria for the configured component carriers, so that both, base station and mobile terminal, arrive at a same order of uplink component carriers. The TPC commands may then be mapped to the component carriers in the given order as they appear in the TPC message(s). The sorting of the component carriers may be for example based on their bandwidth, channel quality (CQI), carrier frequency, or simply on the UE specific or system specific component carrier index labeling etc. Hence, no separate control signaling is needed to define the mapping of TPC commands to the component carriers.

Also in case grouping of carriers is used, there may be some configurations that may not need additional control signaling. For example, it could be agreed that there are two TPC commands sent by the base station, wherein the first TPC command appearing in the TPC message(s) is an all carrier TPC command pertaining to all component carriers configured for the mobile terminal, and the second TPC command appearing in the TPC message(s) is a individual/carrier group TPC command pertaining to all anchor carrier(s) of the mobile terminal in the uplink.

Alternatively, there may be some further RRC signaling from the base station to the mobile terminal that is defining the order of the uplink component carriers configured for the mobile terminal and/or the grouping of the component carriers. The mobile terminal may then apply the TPC commands to the component carriers/groups of component carriers as they appear in the TPC message(s) in the given order.

Configuration of Search Spaces

Furthermore, in another embodiment of the invention, a further potential problem related to the blind decoding operation of the TPC messages is considered. If several TPC messages are required to send the TPC commands to the mobile terminals, the TPC messages may be located in different positions within the control signalling region of the downlink component carrier. The base station may therefore need to ensure that the messages are still provided in the dedicated or common search space of the mobile terminals, and may need to map the messages to the control signalling region of the downlink component carrier accordingly. For more flexibility, its may be beneficial for the base station to configure the mobile terminals with different dedicated or common search spaces so as to obtain more freedom in the mapping of the TPC messages to the control signalling region of the component carrier in the downlink.

Figure 14:
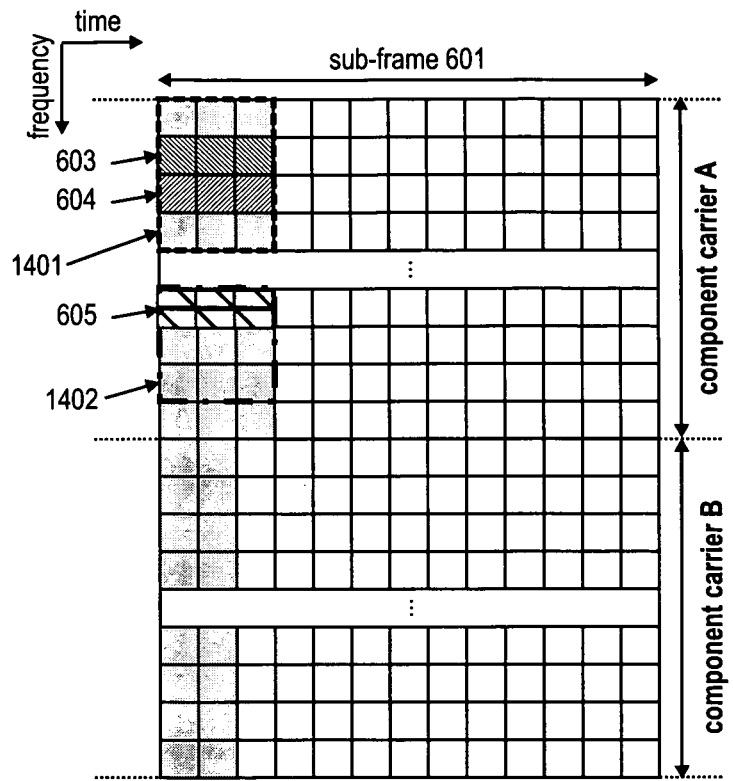
Figure 14:
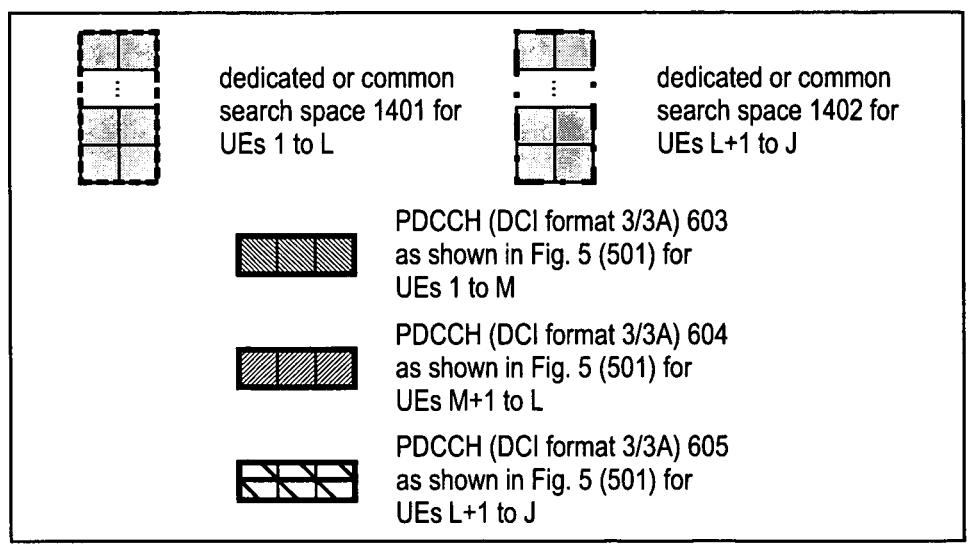

If considering for example the Type 1 signalling format, each TPC message includes all TPC commands for a given mobile terminal. A first group of terminals is thus receiving its TPC commands in the first TPC message mapped to the control signalling region, a second group of terminals is receiving its TPC commands in the second TPC message mapped to the control signalling region, and so on. It may be thus beneficial, to assign different search spaces to the mobile terminals as shown in FIG. 14. As can be seen therein, a first and second group of mobile terminals 1 to L are configured with a first dedicated or common search space 1401, while the third group of terminals L+1 to J is configured with as second dedicated or common search space 1402. Please note that the dedicated or common search spaces may be distinct or overlapping for different groups of terminals.

Summarizing, a method is provided for transmitting transmit power control commands from a base station to a group of mobile terminals in a OFDM based mobile communication system using component carrier aggregation of plural component carriers, the method comprising the following steps performed by the base station: generating a transmit power control message having a plurality of transmit power control fields, wherein multiple of the transmit power control fields of each transmit power control message are respectively assigned to different mobile terminals, wherein the multiple transmit power control fields assigned to each mobile terminal signal transmit power commands for the uplink component carriers aggregated by the respective mobile terminal, mapping the transmit power control message to a control signaling region of a downlink component carrier, and transmitting within a sub-frame the transmit power control message comprised in the control signaling region of the downlink component carrier to the mobile terminals.

The number of transmit power control fields assigned to one mobile terminal may be equal to or smaller than the number of uplink component carriers configured for the mobile terminal.

The method may further comprise the step of transmitting an assignment message to a mobile terminal of said group of mobile terminals, wherein the assignment message includes assignment information assigning the mobile terminal to respective multiple of the plural transmit power control fields of the transit power control message and/or assigning one of the plural temporary identifiers to the mobile terminal.

The assignment message may be a higher layer signalling message, e.g. a RRC message. Alternatively or addition, the transmit power control fields in each transmit power control message may be identified by respective indices, and wherein the assignment message indicated the indices of the transmit power control fields within the transmit power control message assigned to the mobile terminal.

The uplink component carriers aggregated by the mobile terminals may be grouped into groups of carriers and the method is further comprising the steps of: determining for each group of carriers of one of the mobile terminals, a carrier group transmit power control command for said one mobile terminal, wherein each carrier group transmit power control command is a transmit power command to be applied by said one mobile terminal to uplink transmissions on the uplink component carriers belonging to the respective group of carriers, and including the carrier group transmit power control for said one mobile terminal to one of the multiple transmit power control fields assigned to said one mobile terminal in the transmit power control message.

The method may further comprise the step of grouping the component carriers configured for said one mobile terminal, wherein the grouping depends at least on one of the following parameters:
  interference conditions and power level on the assigned uplink component carrier,
  the channel quality on the assigned uplink component carrier,
  the bandwidth of the assigned uplink component carrier,
  status of a load balancing function for the uplink component carriers,
  the number of the transmit power control fields for a mobile terminal available at the base station
  the number of TPC RNTIs available at the base station,
  the type of the assigned uplink component carrier e.g. uplink anchor carrier, and
  the number of ACK/NACKs corresponding to the downlink data transmission that is to be signaled on the assigned uplink component carrier by the mobile terminal.

One of the carrier group transmit power control commands may be an all carrier transmit power control command to control the transmit power used by said one mobile terminal for transmissions on all uplink component carriers configured for the mobile terminal.

Moreover, one of the multiple transmit power control fields assigned to one mobile terminal within the transmit power control message may be signalling a transmit power control command for all uplink component carriers configured for the mobile terminal, and the other transmit power control field(s) of the transmit power control message may be signalling a transmit power control command for a subset of the uplink component carriers configured for the mobile terminal.

The all carrier transmit power control command may be included by the base station within the first transmit power control field assigned to said one mobile terminal within the transmit power control message.

The method may further comprise the steps of: generating a CRC code for the transmit power control fields of the transmit power control message, masking the CRC code with one of plural temporary identifiers common to group of mobile terminals defined for transmit power control to obtain a masked CRC code, and including the masked CRC code to a CRC field of the transmit power control message prior to its mapping to the control signaling region of the downlink component carrier.

The base station may generate and transmit plural transmit power control messages for different groups of mobile terminals within the sub-frame, wherein each of the transmit power control messages is including a masked CRC masked with a different one of the plural temporary identifiers common to group of mobile terminals defined for transmit power control.

The method may further comprise the step of configuring different dedicated and/or common search spaces of the mobile terminals by RRC signalling, wherein a search space of a mobile terminal defines a part of the control signalling region within each sub-frame in which the mobile terminal is to perform blind detection of the control information, including the transmit power control messages, wherein the step of mapping includes mapping the each transmit power control message to a part of the control signaling region within the sub-frame comprised in the search spaces of the mobile terminals assigned transmit power control fields within the respective transmit power control message.

Furthermore, a method is provided for transmit power control on uplink component carriers of a mobile terminal within a OFDM based mobile communication system, the method comprising the following steps performed by the mobile terminal: receiving from a base station a sub-frame, performing within the received sub-frame a blind detection of a transmit power control message within a control signaling region of a downlink component carrier, wherein the transmit power control message has a plurality of transmit power control fields, wherein multiple transmit power control fields of the plurality of transmit power control fields are assigned to the mobile terminal and include transmit power commands for the uplink component carriers aggregated by the mobile terminal, determining transmit power control commands for the mobile terminal's uplink component carriers from multiple transmit power control fields within the transmit power control message assigned to the mobile terminal, and applying the transmit power control commands to uplink transmissions on the uplink component carriers aggregated for the mobile terminal.

The method according may further comprise the step of receiving at least one RRC message from the base station assigning the multiple transmit power control fields within the transmit power control message and/or one of plural temporary identifiers common to plural mobile terminals including the mobile terminal and defined for transmit power control to the mobile terminal.

Moreover, the method may comprise the steps of: obtaining a masked CRC code from a CRC field of the transmit power control message, de-masking the masked CRC code with one of plural temporary identifiers common to plural mobile terminals including the mobile terminal and defined for transmit power control to thereby obtain a CRC code, and verifying successful blind detection of the transmit power control message based on the CRC code.

The method may further comprise the step of receiving from the base station a RRC message indicating a common and/or dedicated search space defining a part of a control signalling region within the sub-frame in which the mobile terminal is to perform blind decoding of control information including the transmit power control message.

Furthermore, a method is provided for transmitting transmit power control commands from a base station to mobile terminals in a OFDM based mobile communication system using component carrier aggregation of plural component carriers, the method comprising the following steps performed by the base station: generating for the mobile terminals plural transmit power control messages, each transmit comprising a plurality of transmit power control fields, wherein a respective one of the transmit power control fields of each transmit power control message is assigned to a respective one of the mobile terminals for signaling a transmit power command for at least one of the uplink component carriers configured for the respective one mobile terminal, mapping the transmit power control messages to a control signaling region of a downlink component carrier, and transmitting within a sub-frame the transmit power control messages comprised within the control signaling region of the downlink component carrier to the mobile terminals.

The method may further comprise the steps of: generating a CRC sequence for each transmit power control message, masking the CRC sequences for the transmit power control messages with different temporary identifiers defined for transmit power control, and adding each masked CRC sequence to its corresponding transmit power control message prior to the mapping step.

The uplink component carriers aggregated by the mobile terminals may be grouped into groups of carriers and the method is further comprising the steps of: determining for each group of carriers of one of the mobile terminals, a carrier group transmit power control command for said one mobile terminal, wherein each carrier group transmit power control command is a transmit power command to be applied by said one mobile terminal to uplink transmissions on the uplink component carriers belonging to the respective group of carriers, and including the carrier group transmit power control commands for said one mobile terminal to the multiple transmit power control fields assigned to said one mobile terminal within the transmit power control messages.

The method may also comprise the step of grouping the component carriers configured for said one mobile terminal, wherein the grouping depends at least on one of the following parameters:
 interference conditions and power level on the assigned uplink component carrier,
 the channel quality on the assigned uplink component carrier,
 the bandwidth of the assigned uplink component carrier,
 status of a load balancing function for the uplink component carriers,
 the type of the assigned uplink component carrier,
 whether or not downlink ACK/NACKs are to be signaled on one or more assigned component carriers, and
 the frequency band of uplink component carriers configured for the mobile terminal.

One of the carrier group transmit power control commands may be a all carrier transmit power control command to control the transmit power used by said one mobile terminal for transmissions on all uplink component carriers configured for the mobile terminal.

The all carrier transmit power control command for a mobile terminal may be included by the base station within the transmit power control field assigned to the mobile terminal within the first transmit power control message mapped to the control signalling region of the downlink component carrier.

The number of transmit power control messages for one mobile terminal may be equal to or smaller than the number of uplink component carriers configured for said one mobile terminal.

Furthermore, a method is provided for transmit power control on uplink component carriers of a mobile terminal within a OFDM based mobile communication system, the method comprising the following steps performed by the mobile terminal: receiving from a base station a sub-frame, performing within the received sub-frame a blind detection of plural transmit power control messages within a control signaling region of a downlink component carrier, wherein each transmit power control message comprises plural transmit power control fields of which one comprises a respective transmit power control command for the mobile terminal, determining the transmit power control commands for the uplink component carriers configured for the mobile terminal from the respective one assigned transmit power control field within the transmit power control messages, and applying the transmit power control commands to uplink transmissions on the uplink component carriers configured for the mobile terminal.

The one transmit power control field of each transmit power control message may have a common index identifying its position within the transmit power control messages and the method is further comprising the step of receiving a RRC message from the base station informing the mobile terminal on the index of the transmit power control field within the transmit power control messages comprising the respective transmit power control commands for the mobile terminal.

The method may also comprise the step of receiving from the base station a RRC message indicating a common and/or dedicated search space within the control signalling region of the sub-frame in which the mobile terminal is to perform blind decoding of control information including the transmit power control messages.

At least one of the multiple transmit power control fields for the mobile terminal in the transmit power control messages may be signalling a carrier group transmit power control command for a subset of the uplink component carriers configured for the mobile terminal that is to be applied to all transmissions of by the mobile terminal on the group of component carriers configured for the mobile terminal, and wherein the step of applying the transmit power control commands comprises applying each carrier group transmit power control command to transmissions on the uplink component carriers of said group of carriers.

One of the multiple transmit power control fields for the mobile terminal may be signalling an all carrier transmit power command that is to be applied to all transmissions of by the mobile terminal on all component carriers configured for the mobile terminal, wherein the step of applying the transmit power control commands comprises applying the all carriers transmit power control command to all transmissions on all uplink component carriers configured by the mobile terminal.

The step of applying the transmit power control commands may comprise applying to transmissions on a subset of uplink component carriers configured for the mobile terminal, a carrier group transmit power control command for said subset of the uplink component carriers in addition to an all carrier transmit power control command for all uplink component carriers configured by the mobile terminal.

Furthermore, a method is provided for transmitting transmit power control commands from a base station to mobile terminals in a OFDM based mobile communication system using component carrier aggregation of plural component carriers, the method comprising the following steps performed by the base station: grouping for each mobile terminal, its plural configured component carriers in at least two groups of carriers, generating for each mobile terminal, a carrier group transmit power control command for each group of carriers of the respective mobile terminal, generating a plurality of transmit power control messages each having a plurality of transmit power control fields assigned to the mobile terminals, wherein the carrier group transmit power control commands are included into the plurality of transmit power control fields, mapping the transmit power control messages to control signaling region of a downlink component carrier, and transmitting within a sub-frame the power control messages within a control signaling region of a downlink component carrier to the mobile terminals.

The number of groups of carriers of a respective mobile terminal may be smaller than the number of uplink component carriers configured for the mobile terminal. The carrier group transmit power control commands of one of the mobile terminals may be mapped to transmit power control fields within one transmit power control message. One of the carrier group transmit power control commands may be a all carrier transmit power control command to control the transmit power used by the respective mobile terminal for transmissions on all uplink component carriers of the mobile terminal. The all carrier transmit power control command may be included to the first transmit power control field assigned to the mobile terminal occurring in said one transmit power control message.

Each carrier group transmit power control command of a respective one of the mobile terminals may be mapped to one transmit power control field within different transmit power control messages.

One of the carrier group transmit power control commands may be an all carrier transmit power control command to control the transmit power used by the respective mobile terminal for transmissions on all uplink component carriers of the mobile terminal.

The "all carrier" transmit power control command may included to the first transmit power control message within the control signalling region of the sub-frame.

A base station is provided for use in a OFDM based mobile communication system using component carrier aggregation of plural component carriers, the base station comprising: a processing unit adapted to generate a transmit power control message having a plurality of transmit power control fields, wherein multiple of the transmit power control fields of each transmit power control message are respectively assigned to different mobile terminals, and wherein the multiple transmit power control fields assigned to each mobile terminal signal transmit power commands for uplink component carriers aggregated by the respective mobile terminal, a mapping unit adapted to map the transmit power control message to a control signaling region of a downlink component carrier, and a transmitting unit adapted to transmit within a sub-frame the transmit power control message comprised in the control signaling region of the downlink component carrier to the mobile terminals.

A mobile terminal is provided for use within a OFDM based mobile communication system, the mobile terminal comprising: a receiver unit adapted to receive a sub-frame from a base station, a processing unit adapted to perform within the received sub-frame a blind detection of a transmit power control message within a control signaling region of a downlink component carrier, wherein the transmit power control message has a plurality of transmit power control fields, wherein multiple transmit power control fields of the plurality of transmit power control fields are assigned to the mobile terminal and include transmit power commands for the uplink component carriers aggregated by the mobile terminal, the processing unit being further adapted to determine transmit power control commands for the mobile terminal's uplink component carriers from multiple transmit power control fields within the transmit power control message assigned to the mobile terminal, and a transmit power control unit adapted to apply the transmit power control commands to uplink transmissions on the uplink component carriers aggregated for the mobile terminal.

Another base station is provided for use in a OFDM based mobile communication system using component carrier aggregation of plural component carriers, the base station comprising: a processing unit adapted to generate for the mobile terminals plural transmit power control messages, each transmit comprising a plurality of transmit power control fields, wherein a respective one of the transmit power control fields of each transmit power control message is assigned to a respective one of the mobile terminals for signaling a transmit power command for at least one of uplink component carriers configured for the respective one mobile terminal, a mapping unit adapted to map the transmit power control messages to a control signaling region of a downlink component carrier, and a transmitting unit adapted to transmit within a sub-frame the transmit power control messages comprised within the control signaling region of the downlink component carrier to the mobile terminals.

Moreover, a mobile terminal is provided for use within a OFDM based mobile communication system, the mobile terminal comprising: a receiver unit adapted to receive a sub-frame from a base station, a processing unit adapted to perform within the received sub-frame a blind detection of plural transmit power control messages within a control signaling region of a downlink component carrier, wherein each transmit power control message comprises plural transmit power control fields of which one comprises a respective transmit power control command for the mobile terminal, and further adapted to determine the transmit power control commands for the uplink component carriers configured for the mobile terminal from the respective one assigned transmit power control field within the transmit power control messages, and a transmit power control unit adapted to apply the transmit power control commands to uplink transmissions on uplink component carriers configured for the mobile terminal.

Furthermore, a base station is provided for use in a OFDM based mobile communication system using component carrier aggregation of plural component carriers, the base station comprising: a grouping unit adapted to group for each mobile terminal, its plural configured component carriers in at least two groups of carriers, a processing unit adapted to generate for each mobile terminal, a carrier group transmit power control command for each group of carriers of the respective mobile terminal, wherein the processing unit is further adapted to generate a plurality of transmit power control messages each having a plurality of transmit power control fields assigned to the mobile terminals, the carrier group transmit power control commands being included into the plurality of transmit power control fields, a mapping unit adapted to map the transmit power control messages to control signaling region of a downlink component carrier, and a transmitting unit adapted to transmit within a sub-frame the power control messages within a control signaling region of a downlink component carrier to the mobile terminals.

A computer readable storage medium is provided, storing instructions that, when executed by a processing unit of a base station, cause the base station to: generate a transmit power control message having a plurality of transmit power control fields, wherein multiple of the transmit power control fields of each transmit power control message are respectively assigned to different mobile terminals, and wherein the multiple transmit power control fields assigned to each mobile terminal signal transmit power commands for uplink component carriers aggregated by the respective mobile terminal, map the transmit power control message to a control signaling region of a downlink component carrier, and transmit within a sub-frame the transmit power control message comprised in the control signaling region of the downlink component carrier to the mobile terminals.

Moreover, a computer readable storage medium storing instructions that, when executed by a processing unit of a mobile terminal, cause the mobile terminal to: receive a sub-frame from a base station, perform within the received sub-frame a blind detection of a transmit power control message within a control signaling region of a downlink component carrier, wherein the transmit power control message has a plurality of transmit power control fields, wherein multiple transmit power control fields of the plurality of transmit power control fields are assigned to the mobile terminal and include transmit power commands for the uplink component carriers aggregated by the mobile terminal, determine transmit power control commands for the mobile terminal's uplink component carriers from multiple transmit power control fields within the transmit power control message assigned to the mobile terminal, and apply the transmit power control commands to uplink transmissions on the uplink component carriers aggregated for the mobile terminal.

Furthermore, a computer readable storage medium is provided for storing instructions that, when executed by a processing unit of a base station, cause the base station to: generate for the mobile terminals plural transmit power control messages, each transmit comprising a plurality of transmit power control fields, wherein a respective one of the transmit power control fields of each transmit power control message is assigned to a respective one of the mobile terminals for signaling a transmit power command for at least one of uplink component carriers configured for the respective one mobile terminal, map the transmit power control messages to a control signaling region of a downlink component carrier, and transmit within a sub-frame the transmit power control messages comprised within the control signaling region of the downlink component carrier to the mobile terminals.

Moreover, a computer readable storage medium storing instructions that, when executed by a processing unit of a mobile terminal, cause the mobile terminal to: receive a sub-frame from a base station, perform within the received sub-frame a blind detection of plural transmit power control messages within a control signaling region of a downlink component carrier, wherein each transmit power control message comprises plural transmit power control fields of which one comprises a respective transmit power control command for the mobile terminal, determine the transmit power control commands for the uplink component carriers configured for the mobile terminal from the respective one assigned transmit power control field within the transmit power control messages, and apply the transmit power control commands to uplink transmissions on uplink component carriers configured for the mobile terminal.

Moreover, a computer readable storage medium storing instructions that, when executed by a processing unit of a base station, cause the base station to: group for each mobile terminal, its plural configured component carriers in at least two groups of carriers, generate for each mobile terminal, a carrier group transmit power control command for each group of carriers of the respective mobile terminal, generate a plurality of transmit power control messages each having a plurality of transmit power control fields assigned to the mobile terminals, the carrier group transmit power control commands being included into the plurality of transmit power control fields, map the transmit power control messages to control signaling region of a downlink component carrier, and transmit within a sub-frame the power control messages within a control signaling region of a downlink component carrier to the mobile terminals.

It is noted that the above computer readable storage medium may also store instructions which cause the computer to execute the steps of any of the above described methods.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for transmitting transmit power control commands from a base station to a group of mobile terminals in a OFDM based mobile communication system using component carrier aggregation of plural uplink component carriers, the method comprising following steps performed by the base station:

generating a transmit power control message having a plurality of transmit power control fields, wherein multiple of the transmit power control fields of the transmit power control message are respectively assigned to different mobile terminals, wherein the multiple transmit power control fields assigned to each mobile terminal signal transmit power commands for the uplink component carriers aggregated by the respective mobile terminal, mapping the transmit power control message to a control signaling region of a downlink component carrier, transmitting within a sub-frame the transmit power control message comprised in the control signaling region of the downlink component carrier to the mobile terminals, generating a Cyclic Redundancy Check (CRC) code for the transmit power control fields of the transmit power control message, masking the CRC code with one of plural temporary identifiers common to group of mobile terminals defined for transmit power control to obtain a first masked CRC code, including the first masked CRC code to a CRC field of the transmit power control message prior to its mapping to the control signaling region of the downlink component carrier, and configuring different dedicated search spaces of the mobile terminals by RRC signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

2. The method according to claim 1, wherein the number of transmit power control fields assigned to one mobile terminal is equal to or smaller than the number of uplink component carriers configured for the mobile terminal.

3. The method according to claim 1, further comprising the step of transmitting an assignment message to a mobile terminal of said group of mobile terminals, wherein the assignment message includes assignment information assigning the mobile terminal to respective multiple of the plural transmit power control fields of the transit power control message.

4. The method according to claim 3, wherein the transmit power control fields in each transmit power control message are identified by respective indices, and wherein the assignment message indicated the indices of the transmit power control fields within the transmit power control message assigned to the mobile terminal.

5. The method according to claim 1, wherein the uplink component carriers aggregated by the mobile terminals are grouped into groups of carriers and the method is further comprising steps of determining for each group of carriers of one of the mobile terminals, a carrier group transmit power control command for said one mobile terminal, wherein each carrier group transmit power control command is a transmit power command to be applied by said one mobile terminal to uplink transmissions on the uplink component carriers belonging to the respective group of carriers, and including the carrier group transmit power control for said one mobile terminal to one of the multiple transmit power control fields assigned to said one mobile terminal in the transmit power control message.

6. The method according to claim 5, wherein one of the carrier group transmit power control commands is an all carrier transmit power control command to control the transmit power used by said one mobile terminal for transmissions on all uplink component carriers configured for the mobile terminal.

7. The method according to claim 6, wherein the all carrier transmit power control command is included by the base station within a first transmit power control field assigned to said one mobile terminal within the transmit power control message.

8. A method for transmit power control on uplink component carriers of a mobile terminal within a OFDM based mobile communication system, the method comprising following steps performed by the mobile terminal:

receiving from a base station a sub-frame, performing within the received sub-frame a blind detection of a transmit power control message within a control signaling region of a downlink component carrier, wherein the transmit power control message has a plurality of transmit power control fields, wherein multiple transmit power control fields of the plurality of transmit power control fields are assigned to the mobile terminal and include transmit power commands for the uplink component carriers aggregated by the mobile terminal, determining transmit power control commands for the mobile terminal's uplink component carriers from multiple transmit power control fields within the transmit power control message assigned to the mobile terminal, applying the transmit power control commands to uplink transmissions on the uplink component carriers aggregated for the mobile terminal, generating a Cyclic Redundancy Check (CRC) code for the transmit power control fields of the transmit power control message, masking the CRC code with one of plural temporary identifiers common to group of mobile terminals defined for transmit power control to obtain a first masked CRC code, including the first masked CRC code to a CRC field of the transmit power control message prior to its mapping to the control signaling region of the downlink component carrier, and configuring different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

9. The method according to claim 8, further comprising a step of receiving at least one RRC message from the base station assigning the multiple transmit power control fields within the transmit power control message.

10. The method according to claim 8, further comprising steps of:
obtaining a third masked CRC code from a CRC field of the transmit power control message,
de-masking the masked CRC code with one of the plural temporary identifiers common to plural mobile terminals including the mobile terminal and defined for transmit power control to thereby obtain the third CRC code, and
verifying successful blind detection of the transmit power control message based on the third CRC code.

11. A method for transmitting transmit power control commands from a base station to mobile terminals in a OFDM based mobile communication system using component carrier aggregation of plural uplink component carriers, the method comprising following steps performed by the base station:
generating for the mobile terminals plural transmit power control messages, each of the transmit power control messages comprising a plurality of transmit power control fields, wherein a respective one of the transmit power control fields of the transmit power control message is assigned to a respective one of the mobile terminals for signaling a transmit power command for at least one of the uplink component carriers configured for the respective one mobile terminal,
mapping the transmit power control messages to a control signaling region of a downlink component carrier,
transmitting within a sub-frame the transmit power control messages comprised within the control signaling region of the downlink component carrier to the mobile terminals,
generating a Cyclic Redundancy Check (CRC) code for the transmit power control fields of the transmit power control message,
masking the CRC code with one of plural temporary identifiers common to group of mobile terminals defined for transmit power control to obtain a first masked CRC code,
including the first masked CRC code to a CRC field of the transmit power control message prior to its mapping to the control signaling region of the downlink component carrier, and
configuring different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

12. The method according to claim 11, wherein the uplink component carriers aggregated by the mobile terminals are grouped into groups of carriers and the method is further comprising steps of:
determining for each group of carriers of one of the mobile terminals, a carrier group transmit power control command for said one mobile terminal, wherein each carrier group transmit power control command is a transmit power command to be applied by said one mobile terminal to uplink transmissions on the uplink component carriers belonging to the respective group of carriers, and
including the carrier group transmit power control commands for said one mobile terminal to the multiple transmit power control fields assigned to said one mobile terminal within the transmit power control messages.

13. The method according to claim 12, wherein one of the carrier group transmit power control commands is an all carrier transmit power control command to control the transmit power used by said one mobile terminal for transmissions on all uplink component carriers configured for the mobile terminal.

14. A method for transmit power control on uplink component carriers of a mobile terminal within a OFDM based mobile communication system, the method comprising following steps performed by the mobile terminal:
receiving from a base station a sub-frame,
performing within the received sub-frame a blind detection of plural transmit power control messages within a control signaling region of a downlink component carrier, wherein each transmit power control message comprises plural transmit power control fields of which one comprises a respective transmit power control command for the mobile terminal,
determining the transmit power control commands for the uplink component carriers configured for the mobile terminal from the respective one assigned transmit power control field within the transmit power control messages,
applying the transmit power control commands to uplink transmissions on the uplink component carriers configured for the mobile terminal,
generating a Cyclic Redundancy Check (CRC) code for the transmit power control fields of the transmit power control message, masking the CRC code with one of plural temporary identifiers common to group of mobile terminals defined for transmit power control to obtain a first masked CRC code, including the first masked CRC code to a CRC field of the transmit power control message prior to its mapping to the control signaling region of the downlink component carrier, and configuring different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal, wherein the base station generates and transmits plural transmit power control messages for different groups of mobile terminals within the sub-frame, wherein each of the transmit power control messages is including a masked CRC masked with a different one of the plural temporary identifiers common to group of mobile terminals defined for transmit power control, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

15. A base station in a OFDM based mobile communication system using component carrier aggregation of plural uplink component carriers, the base station comprising:

a processing unit adapted to generate a transmit power control message having a plurality of transmit power control fields, wherein multiple of the transmit power control fields of the transmit power control message are respectively assigned to different mobile terminals, and wherein the multiple transmit power control fields assigned to each mobile terminal signal transmit power commands for uplink component carriers aggregated by the respective mobile terminal, a mapping unit adapted to map the transmit power control message to a control signaling region of a downlink component carrier, a transmitting unit adapted to transmit within a sub-frame the transmit power control message comprised in the control signaling region of the downlink component carrier to the mobile terminals, wherein the base station generates a Cyclic Redundancy Check (CRC) code for the transmit power control fields of the transmit power control message, masks the CRC code with one of plural temporary identifiers common to group of mobile terminals defined for transmit power control to obtain a first masked CRC code, includes the first masked CRC code to a CRC field of the transmit power control message prior to its mapping to the control signaling region of the downlink component carrier, and configures different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the mapping unit is further adapted to map the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

16. A system of OFDM based mobile communication comprising a mobile terminal and a base station, the mobile terminal comprising:

a receiver unit adapted to receive a sub-frame from the base station, a processing unit adapted to perform within the received sub-frame a blind detection of a transmit power control message within a control signaling region of a downlink component carrier, wherein the transmit power control message has a plurality of transmit power control fields, wherein multiple transmit power control fields of the plurality of transmit power control fields are assigned to the mobile terminal and include transmit power commands for the uplink component carriers aggregated by the mobile terminal, the processing unit being further adapted to determine transmit power control commands for the mobile terminal's uplink component carriers from multiple transmit power control fields within the transmit power control message assigned to the mobile terminal, a transmit power control unit adapted to apply the transmit power control commands to uplink transmissions on the uplink component carriers aggregated for the mobile terminal, wherein the base station generates a CRC code for the transmit power control fields of the transmit power control message, masks the CRC code with one of plural temporary identifiers common to group of mobile terminals defined for transmit power control to obtain a masked CRC code, includes the masked CRC code to a CRC field of the transmit power control message prior to its mapping to the control signaling region of the downlink component carrier, and configures different dedicated search spaces of the mobile terminals by RRC signalling, wherein the base station generates a Cyclic Redundancy Check (CRC) code for the transmit power control fields of the transmit power control message, masks the CRC code with one of plural temporary identifiers common to group of mobile terminals defined for transmit power control to obtain a first masked CRC code, includes the first masked CRC code to a CRC field of the transmit power control message prior to its mapping to the control signaling region of the downlink component carrier, and configures different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

17. A base station in a OFDM based mobile communication system using component carrier aggregation of plural uplink component carriers, the base station comprising:

a processing unit adapted to generate for the mobile terminals plural transmit power control messages, the transmit comprising a plurality of transmit power control fields, wherein a respective one of the transmit power control fields of each transmit power control message is assigned to a respective one of the mobile terminals for signaling a transmit power command for at least one of uplink component carriers configured for the respective one mobile terminal, a mapping unit adapted to map the transmit power control messages to a control signaling region of a downlink component carrier, a transmitting unit adapted to transmit within a sub-frame the transmit power control messages comprised within the control signaling region of the downlink component carrier to the mobile terminals, wherein the base station generates a Cyclic Redundancy Check (CRC) code for the transmit power control fields of the transmit power control message, masks the CRC code with one of plural temporary identifiers common to group of mobile terminals defined for transmit power control to obtain a first masked CRC code, includes the first masked CRC code to a CRC field of the transmit power control message prior to its mapping to the control signaling region of the downlink component carrier, and configures different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the mapping unit is further adapted to map each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

18. A system of OFDM based mobile communication comprising a mobile terminal and a base station, the mobile terminal comprising:

a receiver unit adapted to receive a sub-frame from the base station, a processing unit adapted to perform within the received sub-frame a blind detection of plural transmit power control messages within a control signaling region of a downlink component carrier, wherein each transmit power control message comprises plural transmit power control fields of which one comprises a respective transmit power control command for the mobile terminal, and further adapted to determine the transmit power control commands for the uplink component carriers configured for the mobile terminal from the respective one assigned transmit power control field within the transmit power control messages, a transmit power control unit adapted to apply the transmit power control commands to uplink transmissions on uplink component carriers configured for the mobile terminal, wherein the base station generates a Cyclic Redundancy Check (CRC) code for the transmit power control fields of the transmit power control message, masks the CRC code with one of plural temporary identifiers common to group of mobile terminals defined for transmit power control to obtain a first masked CRC code, includes the first masked CRC code to a CRC field of the transmit power control message prior to its mapping to the control signaling region of the downlink component carrier, and configures different dedicated search spaces of the mobile terminals by Radio Resource Control (RRC) signalling, wherein a search space of a mobile terminal defines a part of the control signalling region within each sub-frame in which the mobile terminal is to perform blind detection of the control information, including the transmit power control messages, wherein the base station generates and transmits plural transmit power control messages for different groups of mobile terminals within the sub-frame, each of the transmit power control messages including a second masked CRC masked with a different one of the plural temporary identifiers common to group of mobile terminals defined for transmit power control, wherein the step of mapping includes mapping the each transmit power control message to a part of the control signalling region within the sub-frame comprised in the search spaces of the mobile terminals assigned transmit power control fields within the respective transmit power control message, and wherein one of the multiple transmit power control fields assigned to one mobile terminal within the transmit power control message is signalling a transmit power control command for all uplink component carriers configured for the mobile terminal, and at least one other transmit power control field of the transmit power control message is signalling a transmit power control command for a subset of the uplink component carriers configured for the mobile terminal.

* * * * *